(12) United States Patent
Seo et al.

(10) Patent No.: US 11,638,214 B2
(45) Date of Patent: Apr. 25, 2023

(54) PHYSICAL DOWNLINK CONTROL CHANNEL MONITORING IN WIRELESS COMMUNICATION SYSTEM

(71) Applicant: LG ELECTRONICS INC., Seoul (KR)

(72) Inventors: Inkwon Seo, Seoul (KR); Joonkui Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/472,278

(22) Filed: Sep. 10, 2021

(65) Prior Publication Data

US 2022/0007292 A1 Jan. 6, 2022

Related U.S. Application Data

(63) Continuation of application No. PCT/KR2020/004206, filed on Mar. 27, 2020.

(60) Provisional application No. 62/826,008, filed on Mar. 29, 2019, provisional application No. 62/826,028, filed on Mar. 29, 2019.

(51) Int. Cl.
*H04W 52/02* (2009.01)
*H04W 76/28* (2018.01)
*H04L 5/00* (2006.01)
*H04W 72/04* (2023.01)

(52) U.S. Cl.
CPC ....... *H04W 52/0235* (2013.01); *H04L 5/0053* (2013.01); *H04W 72/042* (2013.01); *H04W 76/28* (2018.02)

(58) Field of Classification Search
CPC . H04W 76/28; H04W 56/00; H04W 52/0216; H04W 68/12; H04W 52/0229; H04W 52/028; H04W 52/0225
See application file for complete search history.

(56) References Cited

U.S. PATENT DOCUMENTS

| 2015/0156717 A1* | 6/2015 | Narasimha | H04W 68/12 370/311 |
| 2015/0351030 A1* | 12/2015 | Coster | H04W 52/0216 370/311 |
| 2015/0365894 A1* | 12/2015 | Bai | H04W 52/0216 370/311 |

(Continued)

FOREIGN PATENT DOCUMENTS

| KR | 1020180074686 | 7/2018 |
| WO | 2019033017 | 2/2019 |

OTHER PUBLICATIONS

PCT International Application No. PCT/KR2020/004206, International Search Report dated Jul. 6, 2020, 4 pages.
VIVO, "UE adaptation to traffic and power consumption characteristics," R1-1901710, 3GPP TSG RAN WG1 #96, Mar. 2019, 15 pages.

(Continued)

*Primary Examiner* — Chi Ho A Lee
(74) *Attorney, Agent, or Firm* — Lee, Hong, Degerman, Kang & Waimey PC

(57) ABSTRACT

Provided are a method by which a terminal monitors a downlink control channel in a wireless communication system and a corresponding device. An offset-based time window is set before a conventional DRX-on period for monitoring PDCCH, and PSPDCCH for notifying of power saving information in the time window is monitored. Whether to actually monitor the PDCCH in the DRX-on period can be determined on the basis of the PS-PDCCH.

18 Claims, 28 Drawing Sheets

(56) References Cited

U.S. PATENT DOCUMENTS

| | | | |
|---|---|---|---|
| 2016/0174207 A1* | 6/2016 | Belleschi | H04W 52/0216 |
| | | | 455/450 |
| 2016/0198408 A1 | 7/2016 | Jhang et al. | |
| 2016/0330790 A1* | 11/2016 | Chen | H04W 76/28 |
| 2017/0187474 A1* | 6/2017 | Bin Sediq | H04W 52/0225 |
| 2019/0159281 A1* | 5/2019 | Amin | H04W 52/0248 |
| 2020/0221416 A1* | 7/2020 | Wong | H04W 76/28 |
| 2020/0229093 A1* | 7/2020 | Ahmad | H04W 76/28 |
| 2020/0314811 A1* | 10/2020 | Lin | H04L 5/0053 |
| 2021/0045072 A1* | 2/2021 | Parzysz | H04W 56/00 |
| 2021/0259044 A1* | 8/2021 | Islam | H04W 52/0229 |
| 2021/0329731 A1* | 10/2021 | Gu | H04W 52/028 |

OTHER PUBLICATIONS

OPPO, "UE adaptation to the traffic for UE power saving," R1-1810976, 3GPP TSG RAN WG1 Meeting #94bis, Oct. 2018, 10 pages.

European Patent Office Application Serial No. 20782739.5, Search Report dated Mar. 11, 2022, 10 pages.

CMCC, "Discussion on UE power saving schemes with adaption to UE traffic", R1-1903344, 3GPP TSG RAN WG1 #96, Mar. 2019, 14 pages.

ZTE, "On adaption aspects for NR UE power consumption reduction", R1-1900226, 3GPP TSG RAN WG1 Ad-Hoc Meeting 1901, Jan. 2019, 13 pages.

ZTE, "Discussion on potential techniques for UE power saving", R1-1902031, 3GPP TSG RAN WG1 Meeting #96, Mar. 2019, 22 pages.

\* cited by examiner

PHYSICAL DOWNLINK CONTROL CHANNEL MONITORING IN WIRELESS COMMUNICATION SYSTEM

CROSS-REFERENCE TO RELATED APPLICATIONS

This application is a continuation of International Application No. PCT/KR2020/004206, filed on Mar. 27, 2020, which claims the benefit of U.S. Provisional Patent Application Nos. 62/826,008, filed on Mar. 29, 2019, and 62/826,028, filed on Mar. 29, 2019, the contents of which are all hereby incorporated by reference herein in their entireties.

BACKGROUND OF THE DISCLOSURE

Field of the Disclosure

The present disclosure relates to a method of monitoring a physical downlink control channel in a wireless communication system, and an apparatus using the method.

Related Art

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultra-reliable and low latency communication (URLLC) is discussed. This new technology may be called new radio access technology (new RAT or NR) in the present disclosure for convenience. NR is also called the fifth generation (5G) system.

The improvement in performance and functions of a user equipment (UE) such as an increase in UE's display resolution, display size, processors, memories, and applications results in an increase in power consumption. It is important for the UE to reduce power consumption since power supply may be limited to a battery. This is also applied to a UE operating in NR.

One example for reducing power consumption of the UE includes a discontinuous reception (DRX) operation. The UE may need to monitor a physical downlink control channel (PDCCH) in every subframe to know whether there is data to be received. Since the UE does not always receive data in all subframes, such an operation results in unnecessary significant battery consumption. DRX is an operation for reducing the battery consumption. That is, the UE wakes up with a period of a DRX cycle to monitor a PDCCH during a determined time (DRX on duration). If there is no PDCCH detection during the time, the UE enters a sleeping mode, i.e., a state in which a radio frequency (RF) transceiver is turned off. In the presence of the PDCCH detection during the time, a PDCCH monitoring time may be extended, and data transmission and reception may be performed based on the detected PDCCH.

An additional method of reducing power consumption may also be required for the DRX operation.

SUMMARY OF THE DISCLOSURE

The present disclosure provides a method of monitoring a physical downlink control channel in a wireless communication system, and an apparatus using the method.

In one aspect, provided is a method of monitoring a physical downlink control channel (PDCCH) of a user equipment (UE) in a wireless communication system. The method includes receiving an offset based on a starting slot of a discontinuous reception (DRX)-on duration and monitoring a PS-PDCCH notifying of power saving (PS) information in a time window between the starting slot and a time based on the offset.

In another aspect, provided is a user equipment (UE). The UE includes a transceiver transmitting and receiving a radio signal and a processor operatively coupled with the transceiver. The processor is configured to receive an offset based on a starting slot of a discontinuous reception (DRX)-on duration, and monitor a PS-PDCCH notifying of power saving (PS) information in a time window between the starting slot and a time based on the offset.

In still another aspect, provided is a method of transmitting a physical downlink control channel (PDCCH) of a base station (BS) in a wireless communication system. The method includes transmitting an offset based on a starting slot of a discontinuous reception (DRX)-on duration and transmitting a PS-PDCCH notifying of power saving (PS) information in a time window between the starting slot and a time based on the offset.

In still another aspect, provided is a base station (BS). The BS includes a transceiver transmitting and receiving a radio signal and a processor operatively coupled with the transceiver. The processor is configured to transmit an offset based on a starting slot of a discontinuous reception (DRX)-on duration, and transmit a PS-PDCCH notifying of power saving (PS) information in a time window between the starting slot and a time based on the offset.

At least one computer readable medium (CRM) having instructions to be executed by at least one processor, performs operations comprising: receiving an offset based on a starting slot of a discontinuous reception (DRX)-on duration and monitoring a PS-PDCCH notifying of power saving (PS) information in a time window between the starting slot and a time based on the offset.

In still another aspect, provided is an apparatus of a wireless communication system. The apparatus includes a processor and a memory operatively coupled with the processor. The processor is configured to receive an offset based on a starting slot of a discontinuous reception (DRX)-on duration and monitor a PS-PDCCH notifying of power saving (PS) information in a time window between the starting slot and a time based on the offset.

Power consumption can be reduced in monitoring of a downlink control channel. Effects that can be obtained through specific examples of the present specification are not limited to the effects listed above. For example, there may be various technical effects that can be understood or derived from the present specification by a person having ordinary skill in the related art. Accordingly, specific effects of the present specification are not limited to those explicitly described herein, and may include various effects that can be understood or derived from the technical features of the present specification.

DESCRIPTION OF EXEMPLARY EMBODIMENTS

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information".

Technical features described individually in one figure in the present specification may be individually implemented, or may be simultaneously implemented.

Figure 1:
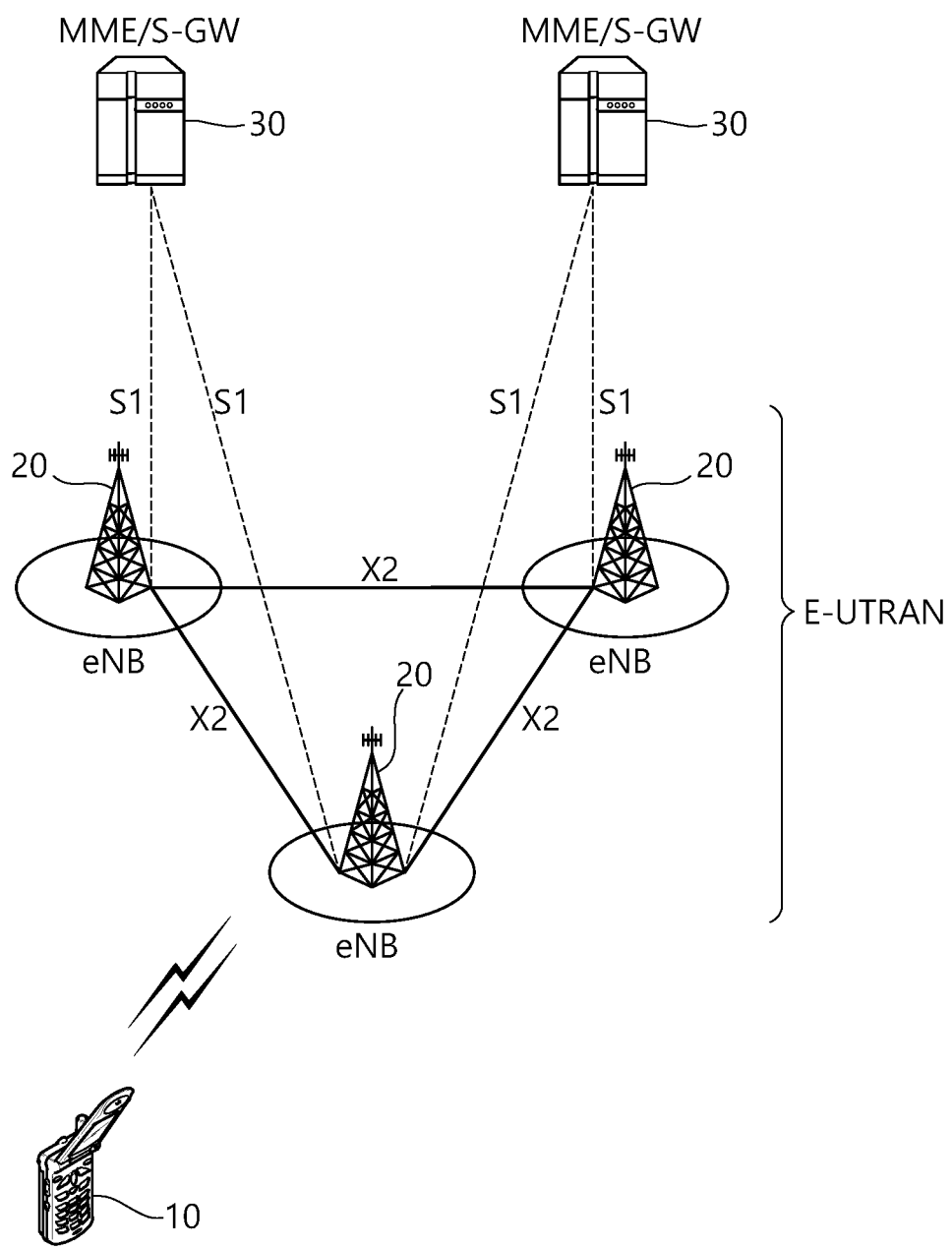
FIG. 1 shows a wireless communication system to which the present disclosure may be applied.

FIG. 1 shows a wireless communication system to which the present disclosure may be applied. The wireless communication system may be referred to as an Evolved-UMTS Terrestrial Radio Access Network (E-UTRAN) or a Long Term Evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
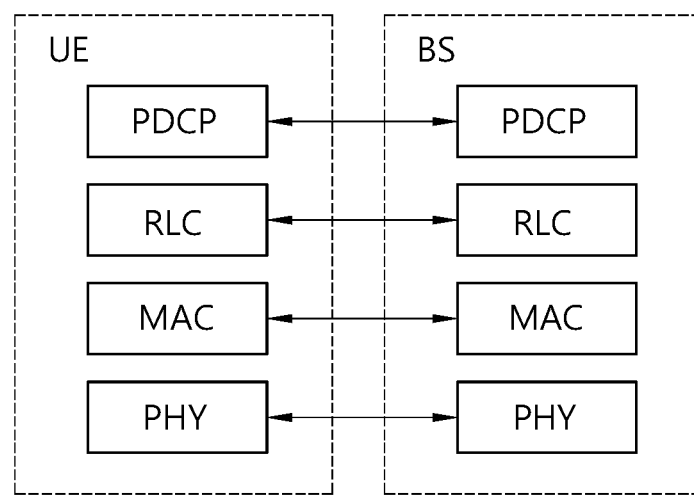
FIG. 2 is a diagram showing a wireless protocol architecture for a user plane.
Figure 3:
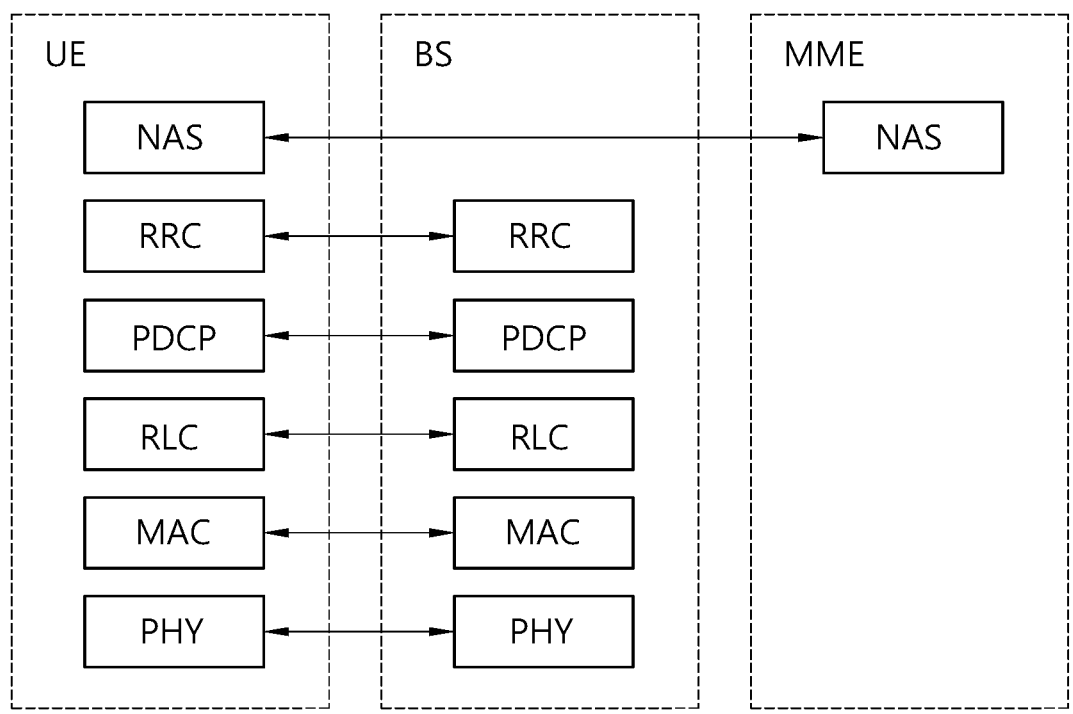
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer(=higher layer) with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Hereinafter, a new radio access technology (new RAT, NR) will be described.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultrareliable and low latency communication (URLLC) is discussed. This new technology may be called new radio access technology (new RAT or NR) in the present disclosure for convenience.

Figure 4:
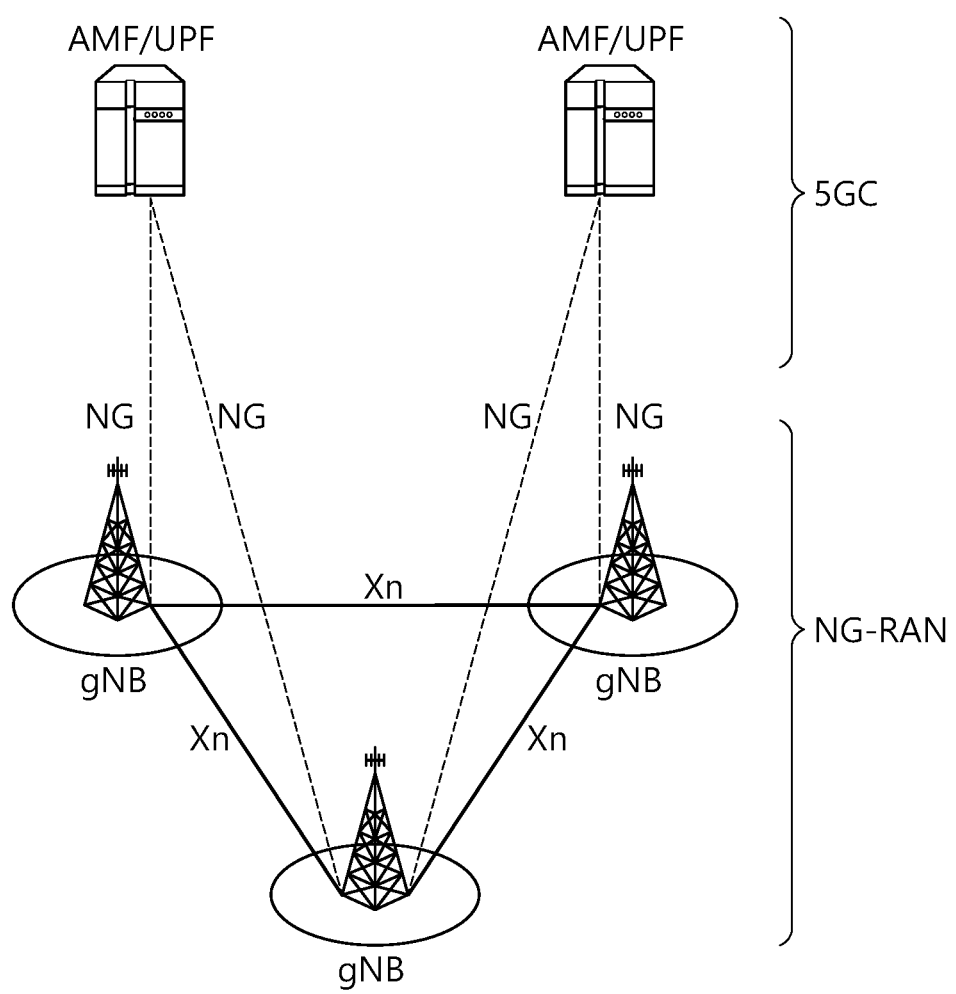
FIG. 4 illustrates a system structure of a next generation radio access network (NG-RAN) to which NR is applied.

FIG. 4 illustrates a system structure of a next generation radio access network (NG-RAN) to which NR is applied.

Referring to FIG. 4, the NG-RAN may include a gNB and/or an eNB that provides user plane and control plane protocol termination to a terminal. FIG. 4 illustrates the case of including only gNBs. The gNB and the eNB are connected by an Xn interface. The gNB and the eNB are connected to a 5G core network (5GC) via an NG interface. More specifically, the gNB and the eNB are connected to an access and mobility management function (AMF) via an NG-C interface and connected to a user plane function (UPF) via an NG-U interface.

Figure 5:
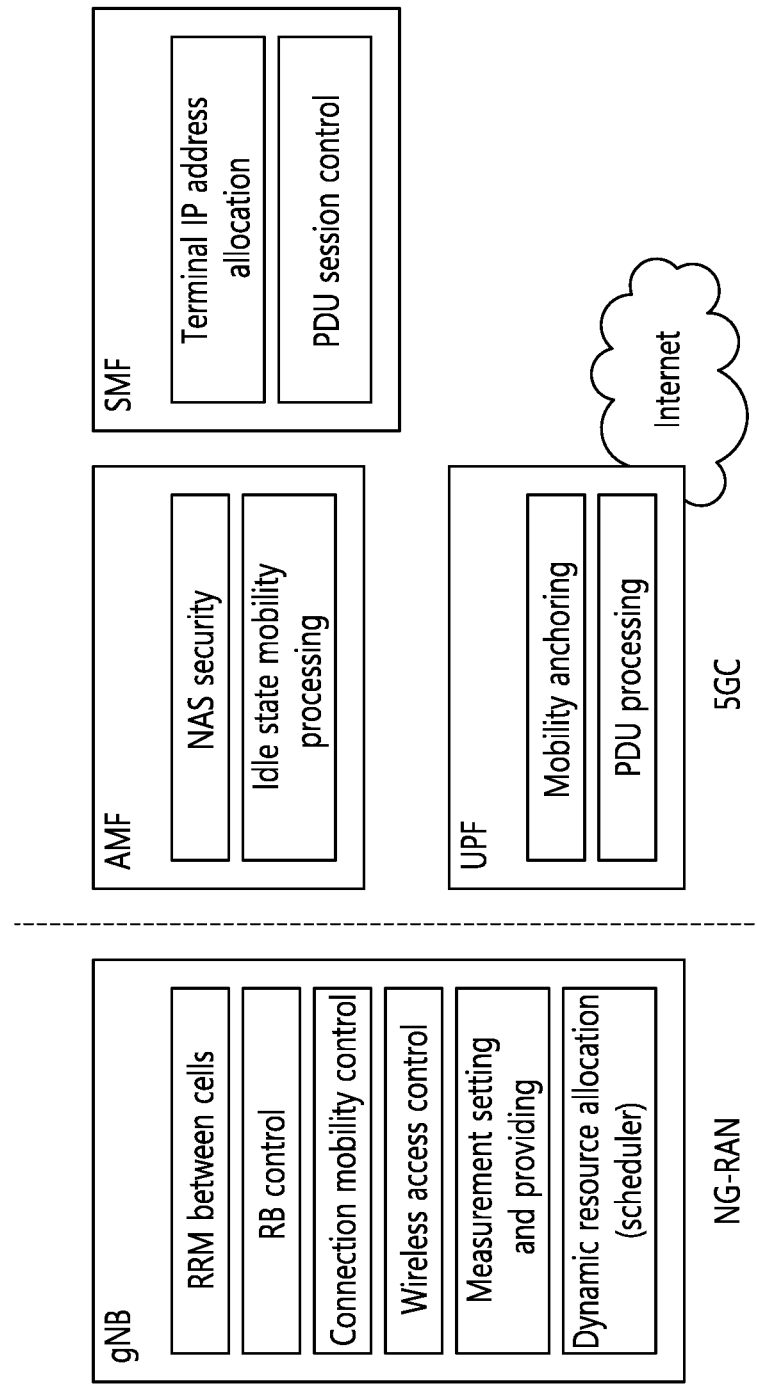
FIG. 5 illustrates a functional division between an NG-RAN and a 5GC.

FIG. 5 illustrates a functional division between an NG-RAN and a 5GC.

Referring to FIG. 5, the gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring, PDU processing, and the like. The SMF may provide functions such as UE IP address assignment, PDU session control, and so on.

Figure 6:
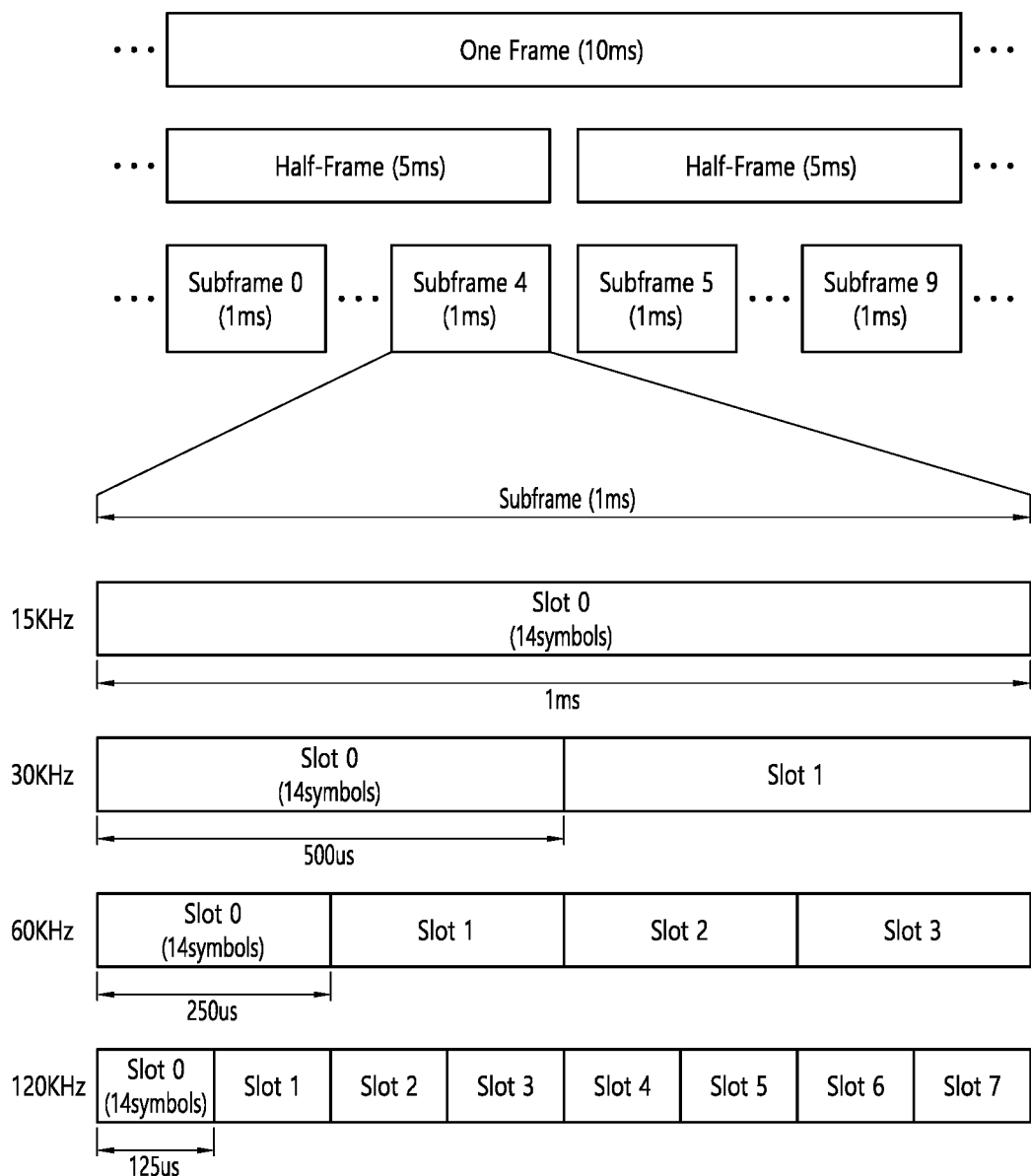
FIG. 6 illustrates an example of a frame structure that may be applied in NR.

FIG. 6 illustrates an example of a frame structure that may be applied in NR.

Referring to FIG. 6, in the NR, a radio frame (hereinafter, also referred to as a frame) may be used in uplink and downlink transmissions. The frame has a length of 10 ms, and may be defined as two 5 ms half-frames (HFs). The HF may be defined as five 1 ms subframes (SFs). The SF may be divided into one or more slots, and the number of slots within the SF depends on a subcarrier spacing (SCS). Each slot includes 12 or 14 OFDM(A) symbols according to a cyclic prefix (CP). In case of using a normal CP, each slot includes 14 symbols. In case of using an extended CP, each slot includes 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

The following table 1 illustrates a subcarrier spacing configuration μ.

TABLE 1

| μ | $\Delta f = 2^\mu \cdot 15$[kHz] | Cyclic prefix |
|---|---|---|
| 0 | 15 | Normal |
| 1 | 30 | Normal |
| 2 | 60 | Normal |
| 3 | 120 | Extended normal |
| 4 | 240 | normal |

The following table 2 illustrates the number of slots in a frame ($N^{frame,\mu}_{slot}$), the number of slots in a subframe ($N^{subframe,\mu}_{slot}$), the number of symbols in a slot ($N^{slot}_{symb}$), and the like, according to subcarrier spacing configurations μ.

TABLE 2

| μ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

FIG. 6 illustrates a case of μ=0, 1, 2, 3.

Table 2-1 below illustrates that the number of symbols per slot, the number of slots per frame, and the number of slots per subframe vary depending on the SCS, in case of using an extended CP.

TABLE 2-1

| MU | $N^{slot}_{symb}$ | $N^{frame,u}_{slot}$ | $N^{subframe,u}_{slot}$ |
|---|---|---|---|
| 2 | 12 | 40 | 4 |

In an NR system, OFDM(A) numerologies (e.g., SCS, CP length, and so on) may be differently configured between a plurality of cells integrated to one UE. Accordingly, an (absolute time) duration of a time resource (e.g., SF, slot or TTI) (for convenience, collectively referred to as a time unit (TU)) configured of the same number of symbols may be differently configured between the integrated cells.

Figure 7:
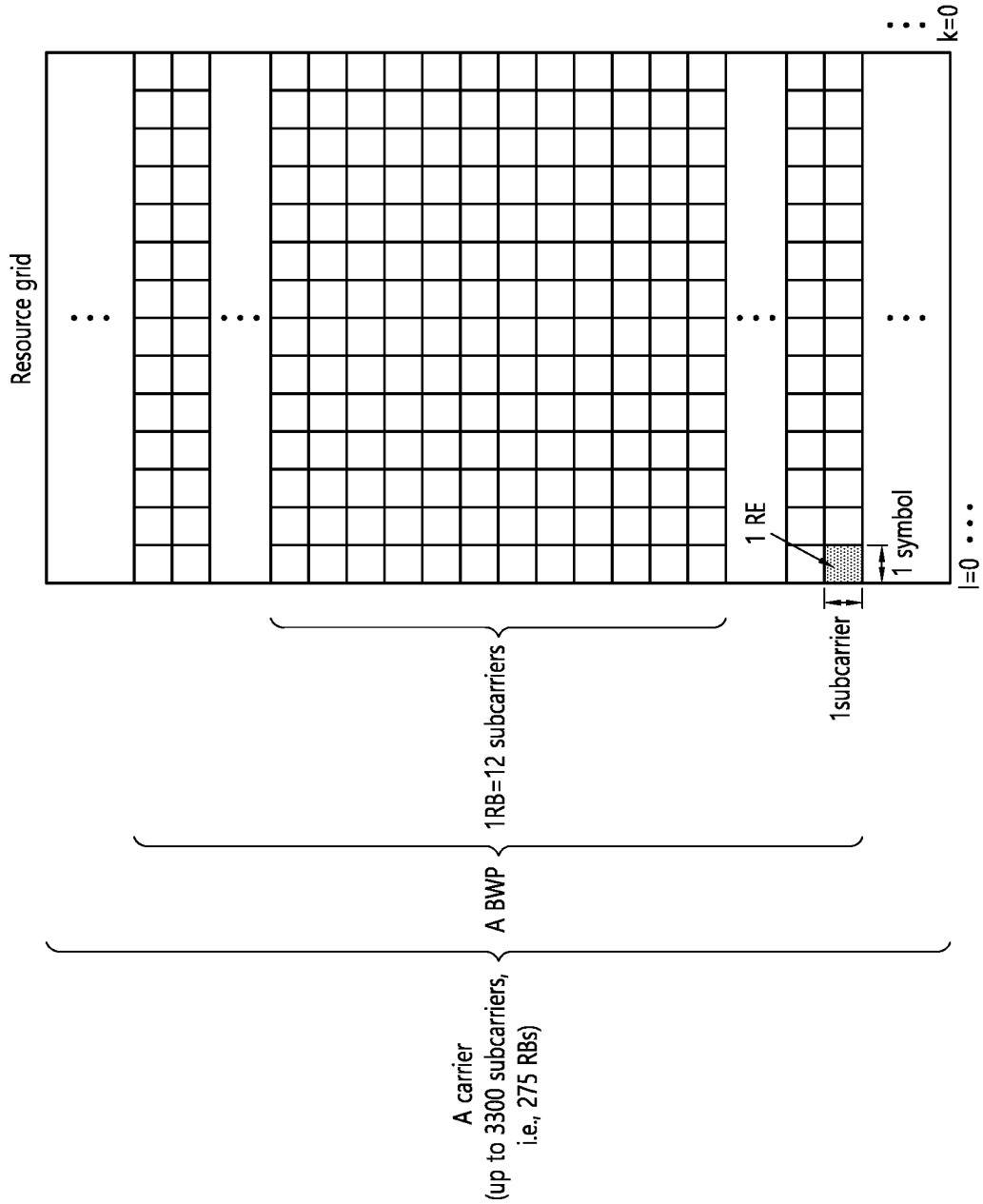
FIG. 7 illustrates a slot structure of an NR frame.

FIG. 7 illustrates a slot structure of an NR frame.

A slot may include a plurality of symbols in a time domain. For example, in case of a normal CP, one slot may include 7 symbols. However, in case of an extended CP, one slot may include 6 symbols. A carrier may include a plurality of subcarriers in a frequency domain. A resource block (RB) may be defined as a plurality of consecutive subcarriers (e.g., 12 subcarriers) in the frequency domain. A bandwidth part (BWP) may be defined as a plurality of consecutive (physical) resource blocks ((P)RBs) in the frequency domain, and the BWP may correspond to one numerology (e.g., SCS, CP length, and so on). The carrier may include up to N (e.g., 5) BWPs. Data communication may be performed via an activated BWP, and only one BWP may be activated for one UE. In a resource grid, each element may be referred to as a resource element (RE), and one complex symbol may be mapped thereto.

A physical downlink control channel (PDCCH) may include one or more control channel elements (CCEs) as illustrated in the following table 3.

TABLE 3

| Aggregation level | Number of CCEs |
|---|---|
| 1 | 1 |
| 2 | 2 |
| 4 | 4 |
| 8 | 8 |
| 16 | 16 |

That is, the PDCCH may be transmitted through a resource including 1, 2, 4, 8, or 16 CCEs. Here, the CCE includes six resource element groups (REGs), and one REG includes one resource block in a frequency domain and one orthogonal frequency division multiplexing (OFDM) symbol in a time domain.

Monitoring implies decoding of each PDCCH candidate according to a downlink control information (DCI) format. The UE monitors a set of PDCCH candidates in one or more CORESETs (to be described below) on an active DL BWP of each activated serving cell in which PDCCH monitoring is configured, according to a corresponding search space set.

A new unit called a control resource set (CORESET) may be introduced in the NR. The UE may receive a PDCCH in the CORESET.

Figure 8:
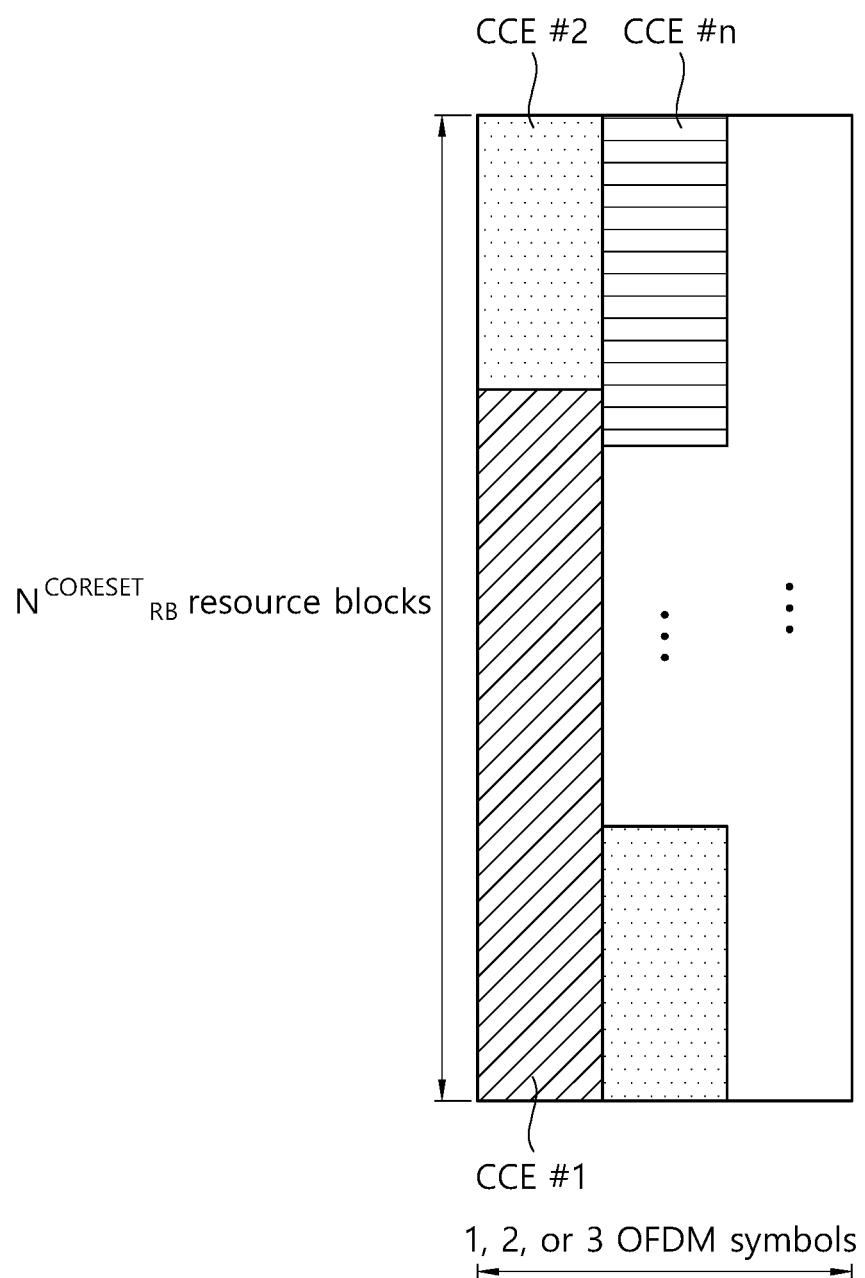
FIG. 8 illustrates CORESET.

FIG. 8 illustrates CORESET.

Referring to FIG. 8, the CORESET includes $N^{CORESET}_{RB}$ number of resource blocks in the frequency domain, and $N^{CORESET}_{symb} \in \{1, 2, 3\}$ number of symbols in the time domain. $N^{CORESET}_{RB}$ and $N^{CORESET}_{symb}$ may be provided by a base station via higher layer signaling. As illustrated in FIG. 8, a plurality of CCEs (or REGs) may be included in the CORESET.

The UE may attempt to detect a PDCCH in units of 1, 2, 4, 8, or 16 CCEs in the CORESET. One or a plurality of CCEs in which PDCCH detection may be attempted may be referred to as PDCCH candidates.

A plurality of CORESETs may be configured for the terminal.

Figure 9:
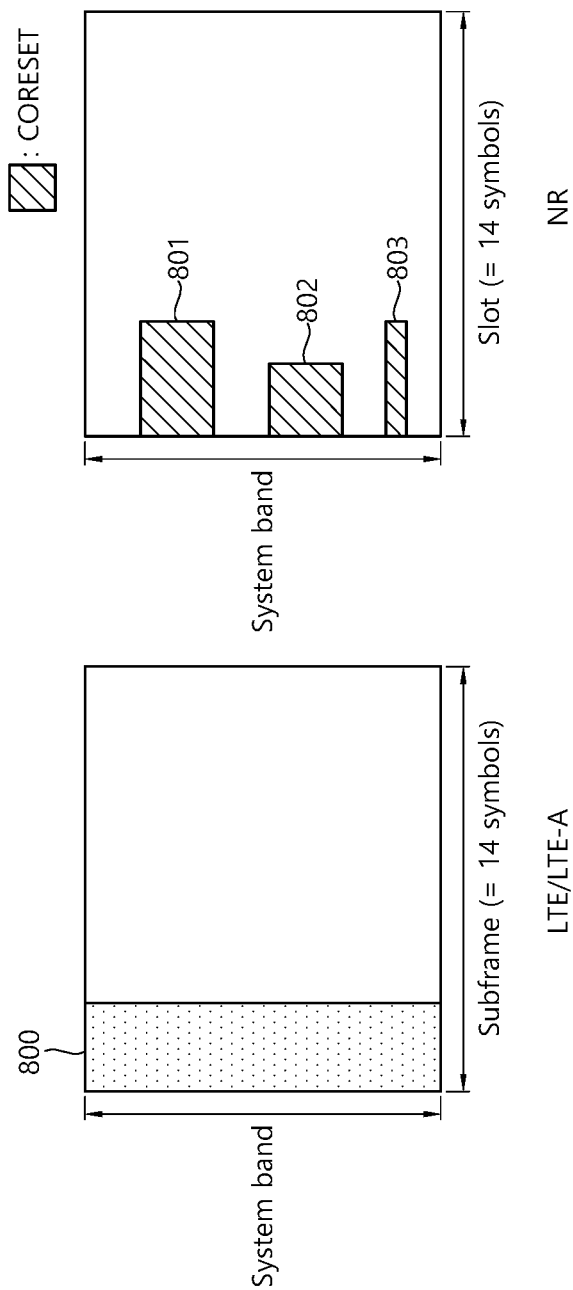
FIG. 9 is a diagram illustrating a difference between a related art control region and the CORESET in NR.

FIG. 9 is a diagram illustrating a difference between a related art control region and the CORESET in NR.

Referring to FIG. 9, a control region 800 in the related art wireless communication system (e.g., LTE/LTE-A) is configured over the entire system band used by a base station (BS). All the terminals, excluding some (e.g., eMTC/NB-IoT terminal) supporting only a narrow band, must be able to receive wireless signals of the entire system band of the BS in order to properly receive/decode control information transmitted by the BS.

On the other hand, in NR, CORESET described above was introduced. CORESETs 801, 802, and 803 are radio resources for control information to be received by the terminal and may use only a portion, rather than the entirety of the system bandwidth. The BS may allocate the CORESET to each UE and may transmit control information through the allocated CORESET. For example, in FIG. 9, a first CORESET 801 may be allocated to UE 1, a second CORESET 802 may be allocated to UE 2, and a third CORESET 803 may be allocated to UE 3. In the NR, the terminal may receive control information from the BS, without necessarily receiving the entire system band.

The CORESET may include a UE-specific CORESET for transmitting UE-specific control information and a common CORESET for transmitting control information common to all UEs.

Meanwhile, NR may require high reliability according to applications. In such a situation, a target block error rate (BLER) for downlink control information (DCI) transmitted through a downlink control channel (e.g., physical downlink control channel (PDCCH)) may remarkably decrease compared to those of conventional technologies. As an example of a method for satisfying requirement that requires high reliability, content included in DCI can be reduced and/or the amount of resources used for DCI transmission can be increased. Here, resources can include at least one of resources in the time domain, resources in the frequency domain, resources in the code domain and resources in the spatial domain.

In NR, the following technologies/features can be applied.

<Self-Contained Subframe Structure>

Figure 10:
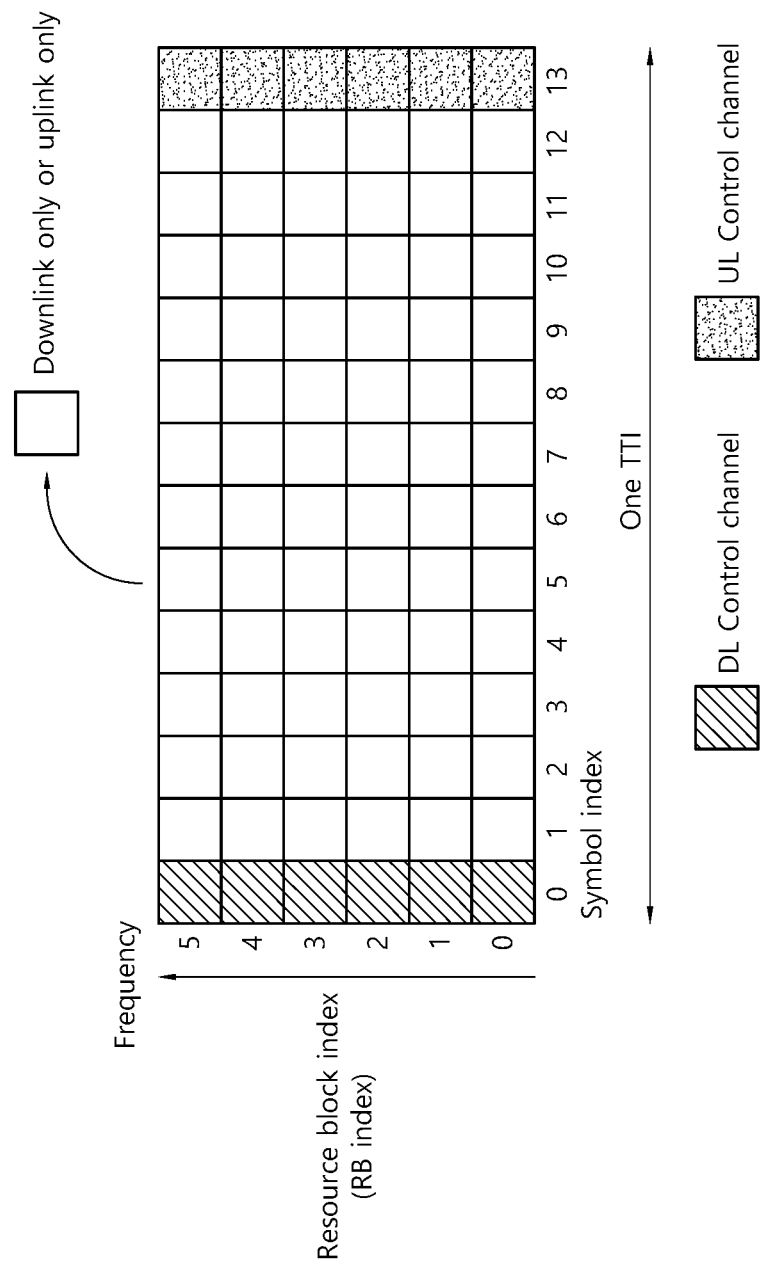
FIG. 10 illustrates an example of a frame structure for new radio access technology.

FIG. 10 illustrates an example of a frame structure for new radio access technology.

In NR, a structure in which a control channel and a data channel are time-division-multiplexed within one TTI, as shown in FIG. 10, can be considered as a frame structure in order to minimize latency.

In FIG. 10, a shaded region represents a downlink control region and a black region represents an uplink control region. The remaining region may be used for downlink (DL) data transmission or uplink (UL) data transmission. This structure is characterized in that DL transmission and UL transmission are sequentially performed within one subframe and thus DL data can be transmitted and UL ACK/NACK can be received within the subframe. Consequently, a time required from occurrence of a data transmission error to data retransmission is reduced, thereby minimizing latency in final data transmission.

In this data and control TDMed subframe structure, a time gap for a base station and a terminal to switch from a transmission mode to a reception mode or from the reception mode to the transmission mode may be required. To this end, some OFDM symbols at a time when DL switches to UL may be set to a guard period (GP) in the self-contained subframe structure.

Figure 11:
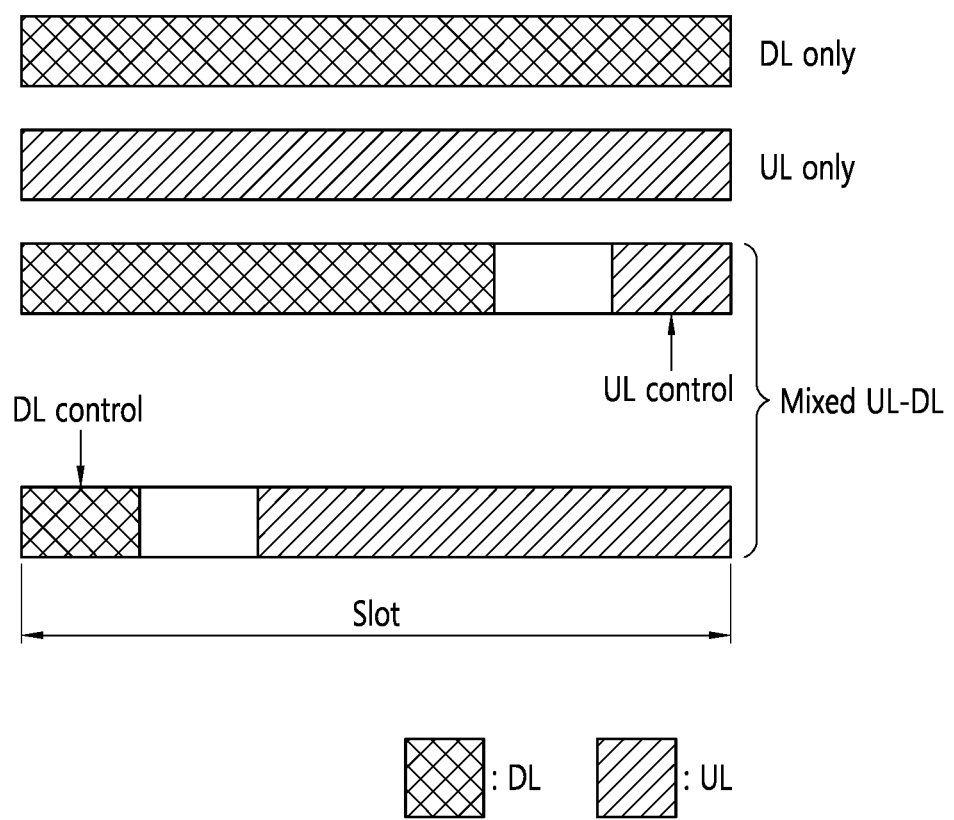
FIG. 11 illustrates a structure of a self-contained slot.

FIG. 11 illustrates a structure of a self-contained slot.

In an NR system, a DL control channel, DL or UL data, a UL control channel, and the like may be contained in one slot. For example, first N symbols (hereinafter, DL control region) in the slot may be used to transmit a DL control channel, and last M symbols (hereinafter, UL control region) in the slot may be used to transmit a UL control channel. N and M are integers greater than or equal to 0. A resource region (hereinafter, a data region) which exists between the DL control region and the UL control region may be used for DL data transmission or UL data transmission. For example, the following configuration may be considered. Respective durations are listed in a temporal order.

1. DL only configuration
2. UL only configuration
3. Mixed UL-DL configuration
  DL region+Guard period (GP)+UL control region
  DL control region+GP+UL region
  DL region: (i) DL data region, (ii) DL control region+DL data region
  UL region: (i) UL data region, (ii) UL data region+UL control region A PDCCH may be transmitted in the DL control region, and a physical downlink shared channel (PDSCH) may be transmitted in the DL data region. A physical uplink control channel (PUCCH) may be transmitted in the UL control region, and a physical uplink shared channel (PUSCH) may be transmitted in the UL data region. Downlink control information (DCI), for example, DL data scheduling information, UL data scheduling information, and the like, may be transmitted on the PDCCH. Uplink control information (UCI), for example, ACK/NACK information about DL data, channel state information (CSI), and a scheduling request (SR), may be transmitted on the PUCCH. A GP provides a time gap in a process in which a BS and a UE switch from a TX mode to an RX mode or a process in which the BS and the UE switch from the RX mode to the TX mode. Some symbols at the time of switching from DL to UL within a subframe may be configured as the GP.

<Analog Beamforming #1>

Wavelengths are shortened in millimeter wave (mmW) and thus a large number of antenna elements can be installed in the same area. That is, the wavelength is 1 cm at 30 GHz and thus a total of 100 antenna elements can be installed in the form of a 2-dimensional array at an interval of 0.5 lambda (wavelength) in a panel of 5×5 cm. Accordingly, it is possible to increase a beamforming (BF) gain using a large number of antenna elements to increase coverage or improve throughput in mmW.

In this case, if a transceiver unit (TXRU) is provided to adjust transmission power and phase per antenna element, independent beamforming per frequency resource can be performed. However, installation of TXRUs for all of about 100 antenna elements decreases effectiveness in terms of cost. Accordingly, a method of mapping a large number of antenna elements to one TXRU and controlling a beam direction using an analog phase shifter is considered. Such analog beamforming can form only one beam direction in all bands and thus cannot provide frequency selective beamforming.

Hybrid beamforming (BF) having a number B of TXRUs which is smaller than Q antenna elements can be considered as an intermediate form of digital BF and analog BF. In this case, the number of directions of beams which can be simultaneously transmitted are limited to B although it depends on a method of connecting the B TXRUs and the Q antenna elements.

<Analog Beamforming #2>

When a plurality of antennas is used in NR, hybrid beamforming which is a combination of digital beamforming and analog beamforming is emerging. Here, in analog beamforming (or RF beamforming) an RF end performs precoding (or combining) and thus it is possible to achieve the performance similar to digital beamforming while reducing the number of RF chains and the number of D/A (or A/D) converters. For convenience, the hybrid beamforming structure may be represented by N TXRUs and M physical antennas. Then, the digital beamforming for the L data layers to be transmitted at the transmitting end may be represented by an N by L matrix, and the converted N digital signals are converted into analog signals via TXRUs, and analog beamforming represented by an M by N matrix is applied.

System information of the NR system may be transmitted in a broadcasting manner. In this case, in one symbol, analog beams belonging to different antenna panels may be simultaneously transmitted. A scheme of introducing a beam RS (BRS) which is a reference signal (RS) transmitted by applying a single analog beam (corresponding to a specific antenna panel) is under discussion to measure a channel per analog beam. The BRS may be defined for a plurality of antenna ports, and each antenna port of the BRS may correspond to a single analog beam. In this case, unlike the BRS, a synchronization signal or an xPBCH may be transmitted by applying all analog beams within an analog beam group so as to be correctly received by any UE.

In the NR, in a time domain, a synchronization signal block (SSB, or also referred to as a synchronization signal and physical broadcast channel (SS/PBCH)) may consist of 4 OFDM symbols indexed from 0 to 3 in an ascending order within a synchronization signal block, and a PBCH associated with a primary synchronization signal (PSS), secondary synchronization signal (SSS), and demodulation reference signal (DMRS) may be mapped to the symbols. As described above, the synchronization signal block may also be represented by an SS/PBCH block.

In NR, since a plurality of synchronization signal blocks (SSBs) may be transmitted at different times, respectively, and the SSB may be used for performing initial access (IA), serving cell measurement, and the like, it is preferable to transmit the SSB first when transmission time and resources of the SSB overlap with those of other signals. To this purpose, the network may broadcast the transmission time and resource information of the SSB or indicate them through UE-specific RRC signaling.

In NR, beams may be used for transmission and reception. If reception performance of a current serving beam is degraded, a process of searching for a new beam through the so-called Beam Failure Recovery (BFR) may be performed.

Since the BFR process is not intended for declaring an error or failure of a link between the network and a UE, it may be assumed that a connection to the current serving cell is retained even if the BFR process is performed. During the BFR process, measurement of different beams (which may be expressed in terms of CSI-RS port or Synchronization Signal Block (SSB) index) configured by the network may be performed, and the best beam for the corresponding UE may be selected. The UE may perform the BFR process in a way that it performs an RACH process associated with a beam yielding a good measurement result.

Now, a transmission configuration indicator (hereinafter, TCI) state will be described. The TCI state may be configured for each CORESET of a control channel, and may determine a parameter for determining an RX beam of the UE, based on the TCI state.

For each DL BWP of a serving cell, a UE may be configured for three or fewer CORESETs. Also, a UE may receive the following information for each CORESET.

1) CORESET index p (one of 0 to 11, where index of each CORESET may be determined uniquely among BWPs of one serving cell), 2) PDCCH DM-RS scrambling sequence initialization value, 3) Duration of a CORESET in the time domain (which may be given in symbol units), 4) Resource block set, 5) CCE-to-REG mapping parameter, 6) Antenna port quasi co-location indicating quasi co-location (QCL) information of a DM-RS antenna port for receiving a PDCCH in each CORESET (from a set of antenna port quasi co-locations provided by a higher layer parameter called 'TCI-State'), 7) Indication of presence of Transmission Configuration Indication (TCI) field for a specific DCI format transmitted by the PDCCH in the CORESET, and so on.

QCL will be described. If a characteristic of a channel through which a symbol on one antenna port is conveyed can be inferred from a characteristic of a channel through which a symbol on the other antenna port is conveyed, the two antenna ports are said to be quasi co-located (QCLed). For example, when two signals A and B are transmitted from the same transmission antenna array to which the same/similar spatial filter is applied, the two signals may go through the same/similar channel state. From a perspective of a receiver, upon receiving one of the two signals, another signal may be detected by using a channel characteristic of the received signal.

In this sense, when it is said that the signals A and B are quasi co-located (QCLed), it may mean that the signals A and B have went through a similar channel condition, and thus channel information estimated to detect the signal A is also useful to detect the signal B. Herein, the channel condition may be defined according to, for example, a Doppler shift, a Doppler spread, an average delay, a delay spread, a spatial reception parameter, or the like.

A 'TCI-State' parameter associates one or two downlink reference signals to corresponding QCL types (QCL types A, B, C, and D, see Table 4).

TABLE 4

| QCL Type | Description |
| --- | --- |
| QCL-TypeA | Doppler shift, Doppler spread, Average delay, Delay spread. |
| QCL-TypeB | Doppler shift, Doppler spread' |
| QCL-TypeC | Doppler shift, Average delay |
| QCL-TypeD | Spatial Rx parameter |

Each 'TCI-State' may include a parameter for configuring a QCL relation between one or two downlink reference signals and a DM-RS port of a PDSCH (or PDDCH) or a CSI-RS port of a CSI-RS resource.

Meanwhile, for each DL BWP configured to a UE in one serving cell, the UE may be provided with 10 (or less) search space sets. For each search space set, the UE may be provided with at least one of the following information.

1) search space set index s (0≤s<40), 2) an association between a CORESET p and the search space set s, 3) a PDCCH monitoring periodicity and a PDCCH monitoring offset (slot unit), 4) a PDCCH monitoring pattern within a slot (e.g., indicating a first symbol of a CORSET in a slot for PDCCH monitoring), 5) the number of slots in which the search space set s exists, 6) the number of PDCCH candidates per CCE aggregation level, 7) information indicating whether the search space set s is CSS or USS.

In the NR, a CORESET #0 may be configured by a PBCH (or a UE-dedicated signaling for handover or a PSCell configuration or a BWP configuration). A search space (SS) set #0 configured by the PBCH may have monitoring offsets (e.g., a slot offset, a symbol offset) different for each associated SSB. This may be required to minimize a search space occasion to be monitored by the UE. Alternatively, this may be required to provide a beam sweeping control/data region capable of performing control/data transmission based on each beam so that communication with the UE is persistently performed in a situation where a best beam of the UE changes dynamically.

Figure 12:
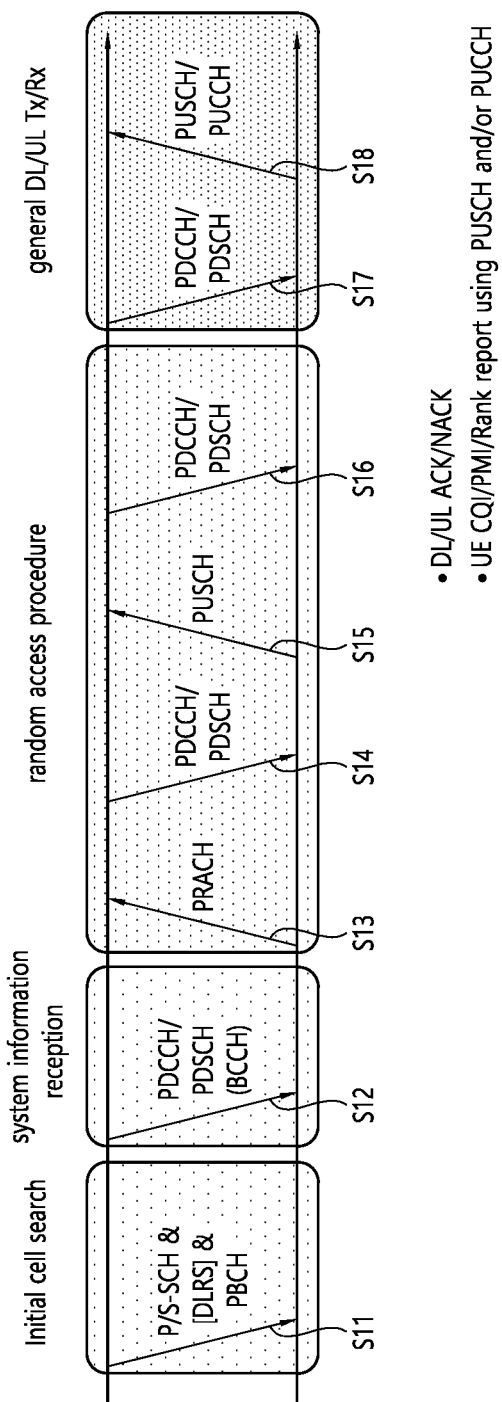
FIG. 12 illustrates physical channels and typical signal transmission.

FIG. 12 illustrates physical channels and typical signal transmission.

Referring to FIG. 12, in a wireless communication system, a UE receives information from a BS through a downlink (DL), and the UE transmits information to the BS through an uplink (UL). The information transmitted/received by the BS and the UE includes data and a variety of control information, and there are various physical channels according to a type/purpose of the information transmitted/received by the BS and the UE.

The UE which is powered on again in a power-off state or which newly enters a cell performs an initial cell search operation such as adjusting synchronization with the BS or the like (S11). To this end, the UE receives a primary synchronization channel (PSCH) and a secondary synchronization channel (SSCH) from the BS to adjust synchronization with the BS, and acquire information such as a cell identity (ID) or the like. In addition, the UE may receive a physical broadcast channel (PBCH) from the BS to acquire broadcasting information in the cell. In addition, the UE may receive a downlink reference signal (DL RS) in an initial cell search step to identify a downlink channel state.

Upon completing the initial cell search, the UE may receive a physical downlink control channel (PDCCH) and a physical downlink control channel (PDSCH) corresponding thereto to acquire more specific system information (S12).

Thereafter, the UE may perform a random access procedure to complete an access to the BS (S13~S16). Specifically, the UE may transmit a preamble through a physical random access channel (PRACH) (S13), and may receive a random access response (RAR) for the preamble through a PDCCH and a PDSCH corresponding thereto (S14). Thereafter, the UE may transmit a physical uplink shared channel (PUSCH) by using scheduling information in the RAR (S15), and may perform a contention resolution procedure similarly to the PDCCH and the PDSCH corresponding thereto (S16).

After performing the aforementioned procedure, the UE may perform PDCCH/PDSCH reception (S17) and PUSCH/physical uplink control channel (PUCCH) transmission (S18) as a typical uplink/downlink signal transmission procedure. Control information transmitted by the UE to the BS is referred to as uplink control information (UCI). The UCI includes hybrid automatic repeat and request (HARQ) acknowledgement (ACK)/negative-ACK (HACK), scheduling request (SR), channel state information (CSI), or the like. The CSI includes a channel quality indicator (CQI), a precoding matrix indicator (PMI), a rank indication (RI), or the like. In general, the UCI is transmitted through the PUCCH. However, when control information and data are to be transmitted simultaneously, the UCI may be transmitted through the PUSCH. In addition, the UE may aperiodically transmit the UCI through the PUSCH according to a request/instruction of a network.

In order to enable reasonable battery consumption when bandwidth adaptation (BA) is configured, only one uplink BWP and one downlink BWP or only one downlink/uplink BWP pair for each uplink carrier may be activated at once in an active serving cell, and all other BWPs configured in the UE are deactivated. In the deactivated BWPs, the UE does not monitor the PDCCH, and does not perform transmission on the PUCCH, PRACH, and UL-SCH.

For the BA, RX and TX bandwidths of the UE are not necessarily as wide as a bandwidth of a cell, and may be adjusted. That is, it may be commanded such that a width is changed (e.g., reduced for a period of low activity for power saving), a position in a frequency domain is moved (e.g., to increase scheduling flexibility), and a subcarrier spacing is changed (e.g., to allow different services). A subset of the entire cell bandwidth of a cell is referred to as a bandwidth part (BWP), and the BA is acquired by configuring BWP(s) to the UE and by notifying the UE about a currently active BWP among configured BWPs. When the BA is configured, the UE only needs to monitor the PDCCH on one active BWP. That is, there is no need to monitor the PDCCH on the entire downlink frequency of the cell. A BWP inactive timer (independent of the aforementioned DRX inactive timer) is used to switch an active BWP to a default BWP. That is, the timer restarts when PDCCH decoding is successful, and switching to the default BWP occurs when the timer expires.

Figure 13:
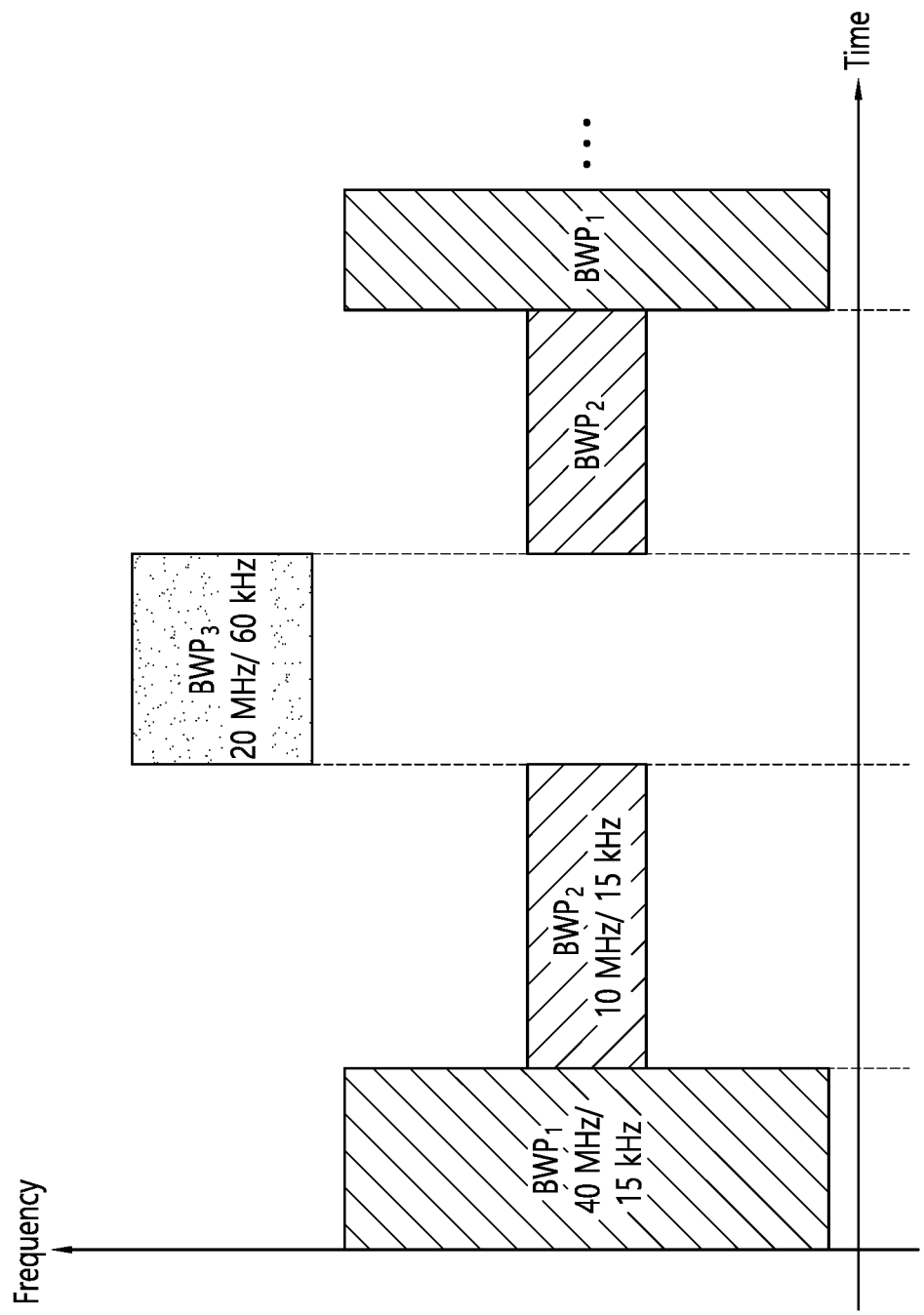
FIG. 13 illustrates a scenario in which three different bandwidth parts are configured.

FIG. 13 illustrates a scenario in which three different bandwidth parts are configured.

FIG. 13 shows an example in which $BWP_1$, $BWP_2$, and $BWP_3$ are configured on a time-frequency resource. The $BWP_1$ may have a width of 40 MHz and a subcarrier spacing of 15 kHz. The $BWP_2$ may have a width of 10 MHz and a subcarrier spacing of 15 kHz. The $BWP_3$ may have a width of 20 MHz and a subcarrier spacing of 60 kHz. In other words, each BWP may have a different width and/or a different subcarrier spacing.

Figure 14:
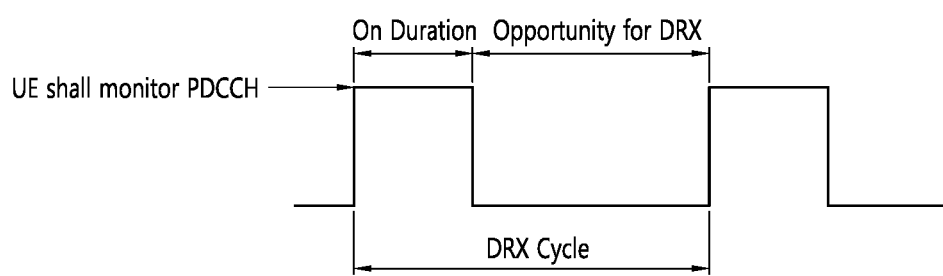
FIG. 14 illustrates a DRX cycle.

FIG. 14 illustrates a DRX cycle.

Referring to FIG. 14, the DRX cycle includes an 'on duration (hereinafter, also referred to as a 'DRX-on duration') and an 'opportunity for DRX'. The DRX cycle defines a time interval in which the on-duration is cyclically repeated. The on-duration indicates a time duration in which a UE performs monitoring to receive a PDCCH. If DRX is configured, the UE performs PDCCH monitoring during the 'on-duration'. If there is a PDCCH successfully detected during the PDCCH monitoring, the UE operates an inactivity timer and maintains an awake state. On the other hand, if there is no PDCCH successfully detected during the PDCCH monitoring, the UE enters a sleep state after the 'on-duration' ends.

Table 5 shows a UE procedure related to DRX (RRC_CONNECTED state). Referring to Table 5, DRX configuration information may be received through higher layer (e.g., RRC) signaling. Whether DRX is ON or OFF may be controlled by a DRX command of a MAC layer. If the DRX is configured, PDCCH monitoring may be performed discontinuously.

TABLE 5

| | Type of signals | UE procedure |
| --- | --- | --- |
| $1^{st}$ step | RRC signalling (MAC-CellGroupConfig) | Receive DRX configuration information |
| $2^{nd}$ step | MAC CE ((Long) DRX command MAC CE) | Receive DRX command |
| $3^{rd}$ step | — | Monitor a PDCCH during an on-duration of a DRX cycle |

MAC-CellGroupConfig may include configuration information required to configure a medium access control (MAC) parameter for a cell group. MAC-CellGroupConfig may also include configuration information regarding DRX. For example, MAC-CellGroupConfig may include information for defining DRX as follows.

Value of drx-OnDurationTimer: This defines a length of a starting duration of a DRX cycle. It may be a timer related to a DRX-on duration.

Value of drx-InactivityTimer: This defines a length of a time duration in which the UE is in an awake state, after a PDCCH occasion in which a PDCCH indicating initial UL or DL data is detected.

Value of drx-HARQ-RTT-TimerDL: This defines a length of a maximum time duration until DL retransmission is received, after DL initial transmission is received.

Value of drx-HARQ-RTT-TimerDL: This defines a length of a maximum time duration until a grant for UL retransmission is received, after a grant for UL initial transmission is received.

drx-LongCycleStartOffset: This defines a time length and a starting point of a DRX cycle drx-ShortCycle (optional): This defines a time length of a short DRX cycle.

Herein, if any one of drx-OnDurationTimer, drx-InactivityTimer, drx-HARQ-RTT-TimerDL, and drx-HARQ-RTT-TimerDL is operating, the UE performs PDCCH monitoring in every PDCCH occasion while maintaining an awake state.

The UE may know a starting point of a DRX cycle, a duration (duration time) of the DRX cycle, a starting point of an on-duration timer, and a duration of the on-duration timer according to a DRX configuration. Thereafter, the UE attempts reception/detection for scheduling information (i.e., PDCCH) within the on-duration of each DRX cycle (this may be represented that scheduling information is monitored).

If the scheduling information (PDCCH) is detected within the on-duration of the DRX cycle (DRX-on duration), an inactivity timer is activated, and detection is attempted for another scheduling information during a given inactivity timer duration (a time duration in which the inactivity timer runs). In this case, the on-duration and the inactivity timer duration in which the UE performs the signal reception/detection operation may be together referred to as an active time. If the scheduling information is not detected in the on-duration, only the on-duration may be the active time.

When the inactivity timer ends without reception/detection of an additional signal (a control signal or data), the UE does not perform scheduling information and corresponding DL reception/UL transmission until an on-duration of a next DRX cycle (a DRX on duration) starts after the inactivity timer ends.

A duration adjustment of a DRX cycle, a duration adjustment of an on-duration timer/inactivity timer, or the like plays an important role in determining whether the UE sleeps. According to the setting for a corresponding parameter, the network may configure the UE to frequently sleep or continuously perform monitoring on the scheduling information. This may act as an element for determining whether power saving of the UE will be achieved.

Now, the present disclosure will be described.

Hereinafter, a PDCCH which provides power saving (PS) information will be referred to as a PS-PDCCH. That is, the PS-PDCCH may be a PDCCH notifying of the PS information. Whether to apply a power saving scheme, a method of applying the power saving scheme, or the like may be indicated to the UE by using the PS-PDCCH.

For example, a DCI format notifying of the PS information through the PS-PDCCH (for convenience, such a DCI format is referred to as a DCI format 2_6) may be received outside (other than) a DRX active time. Hereinafter, receiving the PS-PDCCH may have the equivalent meaning as receiving the DCI format (e.g., DCI format 2_6) through the PS-PDCCH.

For example, the following information may be included in the DCI format (e.g., DCI format 2_6) notifying of the PS information.

1. Block numbers (block number 1, block number 2, . . . , block number N): One block may be configured to a UE.

2. Wake-up indicator (1 bit): This indicates whether a UE wakes up (e.g., the UE wakes up if a value of a wake-up indicator is '1', and may not wake up if it is '0' (the other way around is also possible)). A UE which has woken up may monitor a PDCCH in a DRX-on duration (or an 'on-duration' timer is activated), and a UE which has not woken up may not monitor the PDCCH in the DRX-on duration (or in an associated DRX cycle) (or the 'on-duration' timer is not activated). Alternatively, if this field is present, the wake-up of the UE may be indicated, and if this field is not present, the wake-up of the UE may not be indicated.

3. Secondary cell (Scell) dormancy indication

APS-PDCCH may be used for PDCCH monitoring adaptation which is one of power saving schemes. The PDCCH monitoring adaptation may imply a scheme of adaptively skipping PDCCH monitoring or reducing PDCCH monitoring according to conditions in PDCCH monitoring occasions (which may imply a time point at which the PDCCH can be monitored) in which PDCCH monitoring is scheduled.

APS-PDCCH for the purpose of PDCCH monitoring adaptation may be used for the purpose of search space set on/off. In this case, not only on/off for an individual search space set but also on/off for total (configured) search space sets is possible. Thus, wake-up and go-to-sleep functions may be included.

<PS-PDCCH Monitoring for PDCCH Monitoring Adaptation>

A PS-PDCCH monitoring method or the like is proposed in terms of search space (hereinafter, SS) set configuration adaptation. In general, content proposed below may be applied not only to a PS-PDCCH for the purpose of PDCCH monitoring adaptation (and/or SS set configuration adaptation) but also to PS-PDCCH reception related to power saving of other purposes.

1. Monitoring Occasion Determination for PS-PDCCH

A monitoring occasion based on a typical SS set configuration may be determined by monitoring-related parameters (e.g., monitoring periodicity, pattern, duration, offset, etc.) in the SS set configuration.

On the other hand, a monitoring occasion for a PS-PDCCH (e.g., PS-PDCCH for the wake-up purpose) may be determined by the following method. Herein, the PS-PDCCH for the wake-up purpose may imply a part of a PS-PDCCH for the SS set configuration adaptation, or may imply a PS-PDCCH configured independent of the PS-PDCCH for the SS set configuration adaptation. In addition, a wake-up indication may be transmitted independently through one PS-PDCCH, or may be transmitted by using some fields in one PS-PDCCH together with another power saving scheme.

Hereinafter, although the proposed content is described based on a discontinuous reception (DRX) operation, the same method may also be applied to the non-DRX operation in the present disclosure.

In addition, wake-up in the present disclosure may be applied to all configured SS sets or may indicate wake-up for a specific SS set. For example, when wake-up is indicated for all configured SS sets, a UE may perform PDCCH monitoring in a PDCCH monitoring occasion specified for the all SS sets, and when wake-up is indicated for a specific SS set, PDCCH monitoring may be performed in a PSCCH monitoring occasion specified for the specific SS set.

The following option may be implemented alone or in combination. In addition, as described above, a PS-PDCCH indicating adaptation for an SS set configuration may operate as a PS-PDCCH for the wake-up or go-to-sleep purpose. For example, among monitoring occasions of the PS-PDCCH performing adaptation for the SS set configuration, a monitoring occasion located temporally first in an on-duration of a DRX operation may be interpreted for the wake-up purpose.

A monitoring occasion for a wake-up PS-PDCCH is proposed below, and a monitoring-related parameter may be configured in a PDCCH for power saving other than wake-up by the existing SS set configuration or the like.

If the PS-PDCCH for the wake-up purpose is a part of the PS-PDCCH for SS set configuration adaptation, the wake-up PS-PDCCH may imply a PS-PDCCH transmitted in some monitoring occasions among monitoring occasions of an SS set which monitors the SS set configuration adaptation PS-PDCCH.

Option 1) Offset Between PS-PDCCH Monitoring Occasion and On-Duration

A network may use a PS-PDCCH to indicate whether a UE will perform PDCCH monitoring in a corresponding DRX cycle (for all SS set(s) or specific SS set(s)). In this case, a monitoring occasion of a (wake-up) PS-PDCCH may be determined based on an offset with an on-duration (e.g., a DRX-on duration). For example, assuming that a monitoring occasion is located in a slot before (or after) a specific slot from a starting slot of an on-duration, the specific slot may be determined based on an offset value. Specifically, the specific slot may be directly indicated by the offset value, or the specific slot may be indirectly indicated such that monitoring is performed only in a monitoring occasion located in a specific time duration which comes after a slot indicated by the offset value. This will be described below in greater detail.

The offset value may be predefined, or may be indicated by the network through higher layer signaling (e.g., RRC signaling) or the like.

The aforementioned option 1) may imply that a monitoring occasion for a PS-PDCCH (for the wake-up purpose) is configured independently, even if a monitoring occasion is configured by an SS set configuration for a PS-PDCCH.

The monitoring occasion of the PS-PDCCH (for notifying of whether wake-up is achieved) may be located in a plurality of slots consecutive from a monitoring occasion location designated by the aforementioned offset (or designed by a specific period, e.g., 2 slots, 4 slots, etc.). This may be used to increase a detection probability of the wake-up PS-PDCCH. Increasing of the detection probability may imply that DCI of the same content is repeatedly transmitted in a state of assuming the same TCI state, or may include a case where the DCI of the same content is transmitted in association with different TCI states.

In addition, the above description may imply that the PS-PDCCH for the wake-up purpose is monitored only in some of configured monitoring occasions even if monitoring occasions are designated by a monitoring periodicity, offset, or the like in the SS set configuration for the PS-PDCCH.

The following drawings are provided to illustrate specific examples of the present specification. A name of a specific device or a name of a specific signal/message/field disclosed in the drawings is proposed for exemplary purposes, and technical features of the present specification are not limited to the specific name used in the following drawings.

Figure 15:
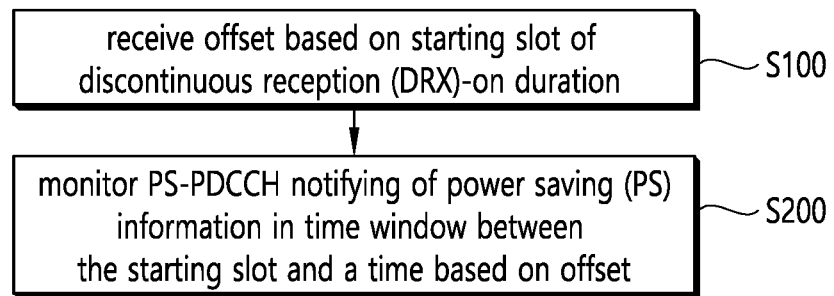
FIG. 15 illustrates a method of monitoring a physical downlink control channel (PDCCH) monitoring of a UE according to the aforementioned option 1).

FIG. 15 illustrates a method of monitoring a physical downlink control channel (PDCCH) monitoring of a UE according to the aforementioned option 1). That is, the drawing shows a specific example of applying the option 1).

Referring to FIG. 15, a UE receives (/acquires) an offset, for example, an offset based on a starting slot of a discontinuous reception (DRX)-on duration (S100), and monitors a PS-PDCCH notifying of power saving (PS) information in a time window between the starting slot of the DRX-on duration and a time based on the offset (S200).

The offset may be received through a higher layer signal from a network, or may be predetermined. That is, an offset value may be received/acquired from the network, or a predetermined offset value may be acquired from a higher layer of the UE.

The PS-PDCCH may include a field indicating whether the UE wakes up (i.e., whether the UE needs to wake up). For example, the aforementioned DCI format 2_6 may be received through the PS-PDCCH, and a 1-bit field indicating whether to wake up may be included in the DCI format 2_6.

Upon receiving the PS-PDCCH in the time window, the UE may monitor the PDCCH in the DRX-on duration. More specifically, when the field indicating whether to wake up and included in the PS-PDCCH indicates the wake-up to the UE, the UE may monitor the PDCCH in the DRX-on duration (for example, by activating an on-duration timer related to a time length of an on-duration in a DRX cycle). When the field indicating whether to wake up and included in the PS-PDCCH does not indicate the wake-up to the UE, the UE may skip monitoring without having to monitor the PDCCH in the DRX-on duration (for example, without having to activate the on-duration timer).

Upon failing in receiving/detecting the PS-PDCCH in the time window, the UE may operate according to a predetermined operation or a configuration/instruction of the network. For example, upon failing in receiving/detecting the PS-PDCCH in the time window, the network may configure/instruct the UE not to monitor the PDCCH (not to wake up) in the DRX-on duration (or it may be predetermined not to do so). Power consumption of the UE can be reduced by monitoring the PDCCH in the DRX-on duration only when the PS-PDCCH is received in a time window located ahead of the DRX-on duration (or only when the field indicating whether to wake up and included in the PS-PDCCH indicates the wake-up to the UE) instead of monitoring the PDCCH in every DRX-on duration.

Alternatively, the network may configure/instruct the UE to monitor the PDCCH in the DRX-on duration, even if the UE does not receive/detect the PS-PDCCH in the time window. For example, for a specific DRX-on duration in which a specific PDCCH shall be transmitted, it may be configured such that the PDCCH is monitored in the specific DRX-on duration even if the PS-PDCCH is not received/detected in the time window (due to an error caused by various reasons).

The UE may monitor the PS-PDCCH only at a PDCCH monitoring occasion located in the time window among a plurality of PDCCH monitoring occasions. More specifically, when there are a plurality of PDCCH monitoring occasions for a specific search space (SS) set capable of monitoring the PS-PDCCH, the UE may monitor the PS-PDCCH only at a PDCCH monitoring occasion located in a time window determined based on the offset value (a time duration between a time based on the offset and a starting slot of the DRX-on duration). When there are N (where N is a natural number greater than or equal to 2) PDCCH monitoring occasions in the time window, the UE may monitor the PS-PDCCH only at a specific PDCCH monitoring occasion among the N PDCCH monitoring occasions (e.g., a first PDCCH monitoring occasion among the N PDCCH monitoring occasions). The PS-PDCCH may not be monitored at a PDCCH monitoring occasion located outside the time window.

In addition, the PDCCH monitoring occasion may be located in one or a plurality of consecutive slots. The number of slots constituting each PDCCH monitoring occasion may be configured by a network. The PDCCH monitoring occasion may be located periodically. The plurality of PDCCH monitoring occasions may be for a specific search space set.

Figure 16:
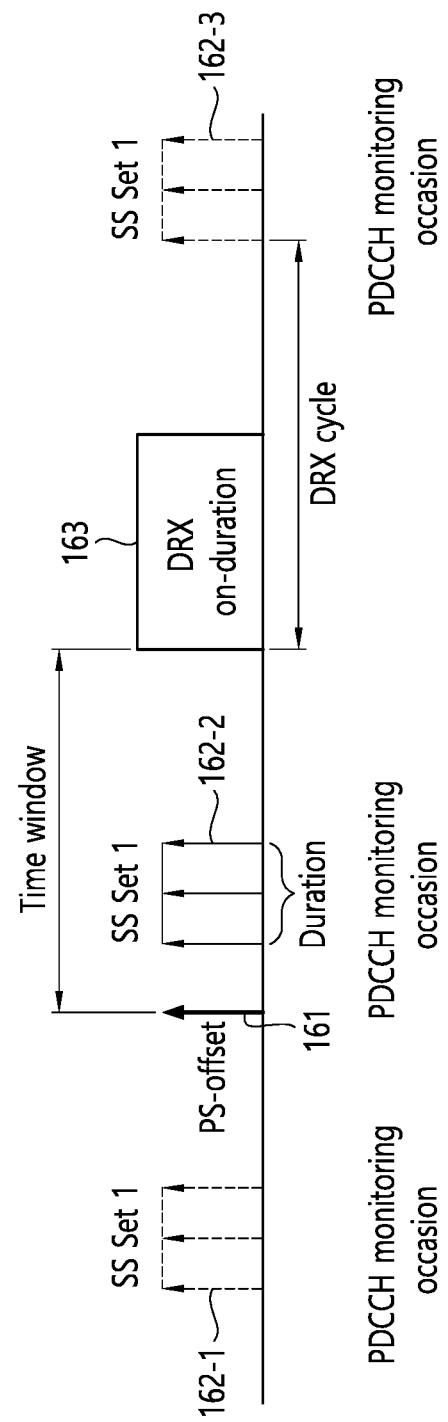
FIG. 16 shows an example in which a UE monitors a PS-PDCCH only at a PDCCH monitoring occasion located in a time window based on an offset and a starting slot of a DRX-on duration among a plurality of PDCCH monitoring occasions.

FIG. 16 shows an example in which a UE monitors a PS-PDCCH only at a PDCCH monitoring occasion located in a time window based on an offset and a starting slot of a DRX-on duration among a plurality of PDCCH monitoring occasions.

Referring to FIG. 16, a specific time 161 (e.g., a specific slot) may be indicated by an offset (PS-offset). A UE may monitor the PS-PDCCH in the time window ranging from the specific time 161 indicated by the offset to prior to a first slot (i.e., a slot at which drx-onDurationTimer starts) of a DRX-on duration 163. For example, among a plurality of PDCCH monitoring occasions 162-1, 162-2, and 162-3 specified for a specific search space set (e.g., SS set 1), the PS-PDCCH may be monitored only in the PDCCH monitoring occasion 162-2 located in the time window.

This method has advantages in that: i) power consumption of a UE can be saved by monitoring a PDCCH in a DRX-on duration only when a PS-PDCCH is received in a time window located before the DRX-on duration rather than monitoring the PDCCH in every DRX-on duration, and ii) power consumption can be additionally saved by monitoring the PS-PDCCH in only some of a plurality of PDCCH monitoring occasions for monitoring the PS-PDCCH. The PS-PDCCH is transmitted by the network before the DRX-on duration, and thus may serve as a wake-up signal so that the UE monitors the PDCCH in the DRX on duration. PS-PDCCH monitoring performed in all periodic PDCCH monitoring occasions specified for a specific SS set to monitor the PS-PDCCH may result in unnecessary power consumption and thus may be inefficient. In the present disclosure, a time window is configured through an offset value, and the PS-PDCCH monitoring is performed only in a PDCCH monitoring occasion in the time window, thereby reducing power consumption and providing an effective DRX operation.

The PDCCH monitoring occasion 162-2 may be located only in one slot, or may be located in a plurality of consecutive slots as shown in FIG. 16. The plurality of consecutive slots may be indicated by a 'duration'.

Figure 17:
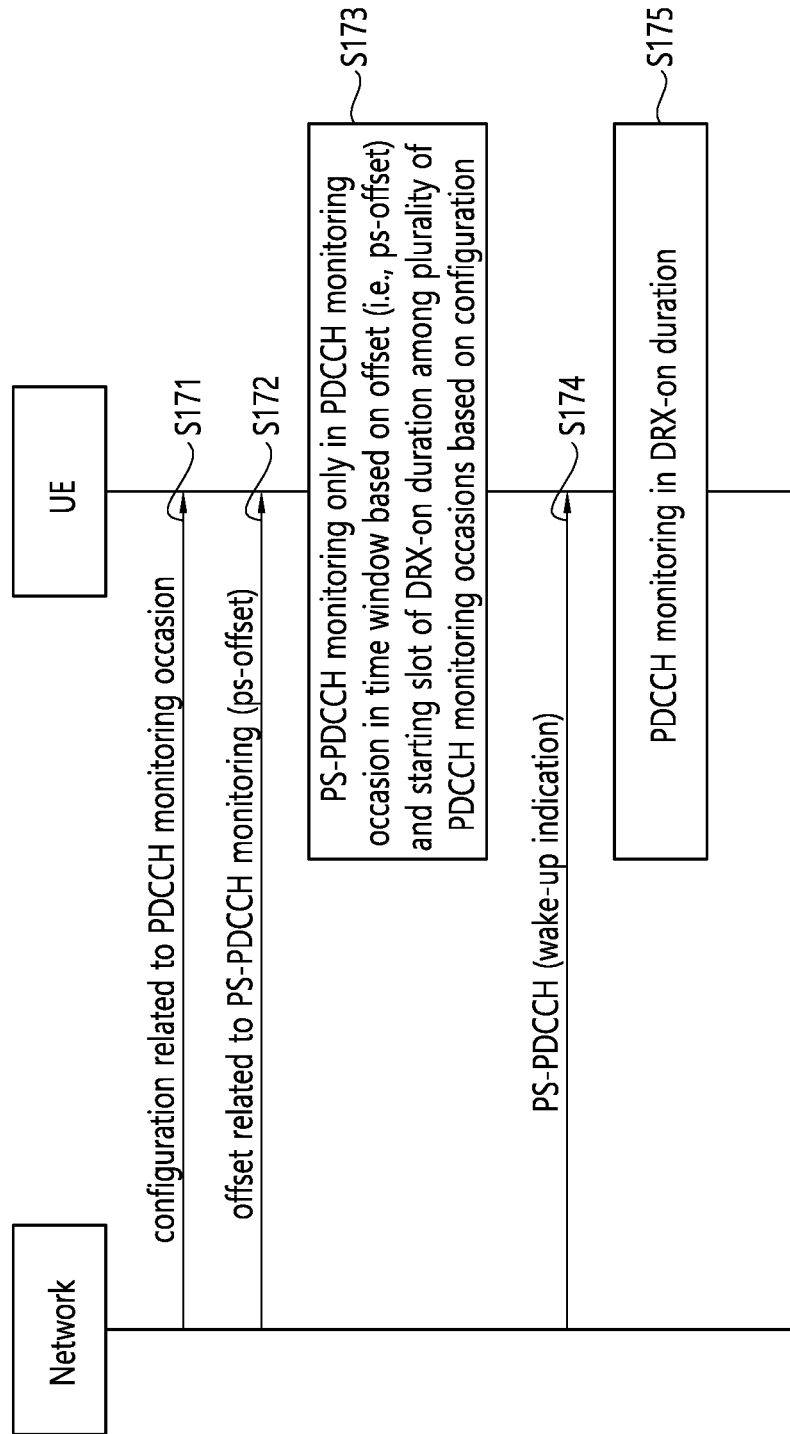
FIG. 17 illustrates an operation between a network and a UE according to the option 1.

FIG. 17 illustrates an operation between a network and a UE according to the option 1.

Referring to FIG. 17, a network (e.g., BS) provides a configuration related to a PDCCH monitoring occasion to a UE (S171). For example, a search space configuration may be provided to the UE.

The following table is an example of the search space configuration.

TABLE 6

| | |
|---|---|
| SearchSpace ::= | SEQUENCE { |
| searchSpaceId | SearchSpaceId, |
| controlResourceSetId | ControlResourceSetId OPTIONAL, -- Cond SetupOnly |
| monitoringSlotPeriodicityAndOffset | CHOICE { |
| sl1 | NULL, |
| sl2 | INTEGER (0 ... 1), |
| sl4 | INTEGER (0 ... 3), |
| sl5 | INTEGER (0 ... 4), |
| sl8 | INTEGER (0 ... 7), |
| sl10 | INTEGER (0 ... 9), |
| sl16 | INTEGER (0 ... 15), |
| sl20 | INTEGER (0 ... 19), |
| sl40 | INTEGER (0 ... 39), |
| sl80 | INTEGER (0 ... 79), |
| sl160 | INTEGER (0 ... 159), |
| sl320 | INTEGER (0 ... 319), |
| sl640 | INTEGER (0 ... 639), |
| sl1280 | INTEGER (0 ... 1279), |
| sl2560 | INTEGER (0 ... 2559) |
| } | |
| OPTIONAL, -- Cond Setup | |
| duration | INTEGER (2 ... 2559) |
| OPTIONAL, -- Need R | |
| monitoringSymbolsWithinSlot | BIT STRING (SIZE (14)) OPTIONAL, |
| -- Cond Setup | |
| nrofCandidates | SEQUENCE { |
| aggregationLevel1 | ENUMERATED {n0, n1, n2, n3, n4, n5, n6, n8}, |
| aggregationLevel2 | ENUMERATED {n0, n1, n2, n3, n4, n5, n6, n8}, |
| aggregationLevel4 | ENUMERATED {n0, n1, n2, n3, n4, n5, n6, n8}, |
| aggregationLevel8 | ENUMERATED {n0, n1, n2, n3, n4, n5, n6, n8}, |
| aggregationLevel16 | ENUMERATED {n0, n1, n2, n3, n4, n5, n6, n8} |
| } | |

TABLE 6-continued

```
OPTIONAL,     -- Cond Setup
  searchSpaceType                         CHOICE {
    common                                  SEQUENCE {
      dci-Format0-0-AndFormat1-0              SEQUENCE {
        ...
      }
OPTIONAL,     -- Need R
      dci-Format2-0                           SEQUENCE {
        nrofCandidates-SFI                      SEQUENCE {
          aggregationLevel1         ENUMERATED{n1, n2}    OPTIONAL,
-- Need R
          aggregationLevel2                   ENUMERATED {n1, n2}
OPTIONAL,   -- Need R
          aggregationLevel4         ENUMERATED{n1, n2}    OPTIONAL,
-- Need R
          aggregationLevel8         ENUMERATED{n1, n2}    OPTIONAL,
-- Need R
          aggregationLevel16        ENUMERATED{n1, n2}    OPTIONAL
-- Need R
        },
        ...
      }                                                   OPTIONAL,  --
Need R
      dci-Format2-1                           SEQUENCE {
        ...
      }                                                   OPTIONAL,  --
Need R
      dci-Format2-2                           SEQUENCE {
        ...
      }                                                   OPTIONAL,  --
Need R
      dci-Format2-3                           SEQUENCE {
        dummy1       ENUMERATED {sl1, sl2, sl4, sl5, sl8, sl10, sl16, sl20}
OPTIONAL,   -- Cond Setup
        dummy2    ENUMERATED {n1, n2},
        ...
      }                                                   OPTIONAL   --
Need R
    },
    ue-Specific                             SEQUENCE {
      dci-Formats    ENUMERATED {formats0-0-And-1-0, formats0-
1-And- 1-1 },
      ...
    }
  }                                                       OPTIONAL   --
Cond Setup
}
```

The search space configuration notifies of 'monitoringSlotPeriodicityAndOffset' which is a PDCCH monitoring periodicity and offset for a specific search space (identified by 'searchSpaceId'), 'duration' which is the number of consecutive slots in each occasion (time point), 'nrofCandidates' which is the number of PDCCH candidates for each aggregation level, or the like. That is, a variety of information related to the PDCCH monitoring occasion is notified.

The network notifies of an offset related to PS-PDCCH monitoring to the UE (S172). In this case, the offset is denoted by 'ps-offset'.

The UE performs PS-PDCCH monitoring only in a PDCCH monitoring occasion in a time window based on the offset (i.e., ps-offset) and a starting slot of a DRX-on duration among a plurality of PDCCH monitoring occasions based on the configuration (e.g., the search space configuration) (S173).

The network may transmit a PS-PDCCH to the UE (in at least one of the PDDCH monitoring occasions(s) in the time window) (S174). The PS-PDCCH may include a field indicating (notifying) to the UE about whether to wake up. Assume that the field indicates the wake-up to the UE. The UE may detect the PS-PDSCH. In this case, a PDCCH is monitored in a DRX-on duration (next to the time window) (S175). Upon detecting the PDCCH as a result of the monitoring, PDSCH reception or PUSCH transmission may be performed based thereon.

Upon detecting scheduling information (PDCCH) within an on-duration of a DRX cycle (i.e., DRX-on duration), an inactivity timer is activated, and detection on another scheduling information may be attempted during a given inactivity timer duration (a time duration in which the inactivity timer runs). In this case, the on-duration and inactivity timer duration, in which the UE performs a signal reception/detection operation, may be collectively referred to an active time.

Although not shown in FIG. 17, upon failing in detection of the PS-PDCCH in the PDCCH monitoring occasion in the time window, a predetermined operation may be performed, or an operation based on a configuration/instruction of the network may be performed. For example, the UE may not monitor the PDCCH in a DRX-on duration next to the time window.

Option 2) Nearest Monitoring Occasion Based on SS Set Configuration from On-Duration In a case where the SS set configuration is also indicated for the PS-PDCCH for the wake-up purpose or an SS set configuration which monitors a PS-PDCCH indicating adaptation for an SS set configuration is indicated and in a case where a monitoring occasion is determined by parameters (e.g., monitoring periodicity, offset, etc.) in the configuration, regarding the PS-PDCCH for the wake-up purpose and associated with a DRX operation, a monitoring occasion for the PS-PDCCH for the wake-up purpose may be determined by the SS set configuration (otherwise, in a case where the DRX operation is not applied or in case of a monitoring occasion of the SS set after the wake-up, the monitoring occasion may be determined by a PS-PDCCH configuration, which may be used for on/off, configuration change, or the like for the configured SS set). For example, monitoring on the PS-PDCCH for the wake-up purpose may start in a monitoring occasion nearest to a DRX-on duration among monitoring occasions based on the SS set configuration. In this case, the nearest monitoring occasion may imply the nearest monitoring occasion among monitoring occasions before the start of the on-duration, or may imply the nearest monitoring occasion among monitoring occasions after the start of the on-duration.

Alternatively, to ensure a processing time or the like for the PDCCH, the network may configure a specific offset (in this case, the offset may be applied before or after an on-duration starting point), and a monitoring occasion nearest from the offset may be defined as a starting point of PS-PDCCH monitoring.

This may be interpreted as a method of defining a monitoring starting point of a corresponding SS set in each DRX cycle of a DRX operation when the PS-PDCCH plays a role of not only wake-up but also SS set configuration adaptation (this may be also applied to other options). In addition, in this case, it may be assumed that an initial monitoring occasion of each DRX cycle is used for the wake-up purpose.

Option 3) Reusing Existing SS Set Configuration as a Wake-Up Indication

Whether to wake up may be determined with monitoring on the existing SS set without having to additionally define a PS-PDCCH for wake-up. For example, a network may configure a specific SS set for the wake-up purpose among SS sets configured in a conventional manner. In this case, a UE may perform only monitoring on the SS set in an on-duration of each DRX cycle. Thereafter, upon detecting a PDCCH in the SS set, monitoring on another SS set configured in a corresponding active BWP may start. That is, a representative SS set may be configured by the network, and whether to monitor another SS set may be determined (or assumed to be determined) by the UE according to whether the PDCCH is detected in the representative SS set.

Option 4) Wake-Up PS-PDCCH Monitoring on Existing SS Set

A network may be configured to use one or a plurality of the existing SS sets for the purpose of wake-up PS-PDCCH monitoring. When monitoring on a corresponding SS set is performed in an on-duration of a DRX operation, a UE may perform monitoring on a PDCCH designated on an SS set configuration (e.g., a PDCCH designated depending on RNTI, DCI type) and a wake-up PS-PDCCH together. This may be implemented in such a manner that a configured PDCCH and a wake-up PS-PDCCH are monitored in all monitoring occasions or only a PS-PDCCH is monitored in a specific monitoring occasion (e.g., a monitoring occasion existing in a specific range from an on-duration starting point, a designed number of monitoring occasions from the on-duration starting point).

In addition, if both the existing configured PDCCH and the wake-up PS-PDCCH are monitored, it may be interpreted that detection of the existing configured PDCCH indicates wake-up. In this case, upon detecting one of the PS-PDCCH and the existing configured PDCCH, the UE may perform monitoring on another SS set.

Alternatively, the existing configured PDCCH may imply wake-up for all configured SS sets, and the wake-up PDCCH may imply wake-up for specific SS set(s).

In order to decrease complexity in this operation, it may be assumed that a size of DCI of the PS-PDCCH is equal to that of DCI monitored in a corresponding SS set. In this case, the wake-up PS-PDCCH and DCI configured to be monitored in the SS set may be identified by RNTI or the like.

<PS-PDCCH for PDCCH Monitoring Adaptation>

A PS-PDCCH may be used for not only wake-up but also adaptation for a monitoring operation of a PDCCH. For example, the PS-PDCCH for PDCCH monitoring adaptation may be used for dynamic adaptation of an SS set configuration. As described above, the SS set configuration adaptation may dynamically configure on/off for each SS set, and if associated with a DRX operation, a first monitoring occasion (of an SS set adaptation PS-PDCCH) in each DRX cycle may operate as wake-up or go-to-sleep. The present disclosure proposes a method for implementing this.

1. Wake-Up Purpose

A. As described above, a first monitoring occasion of an SS set adaptation PS-PDCCH in a DRX cycle may be interpreted as a wake-up signal in terms of determining whether to perform monitoring in the DRX cycle.

i. Whether to wake up may be determined in a first monitoring occasion or may be determined in a plurality of monitoring occasions. Being determined in the plurality of monitoring occasions may imply that a UE determines the number of monitoring occasions, periodicity, or the like of an SS set adaptation PS-PDCCH by a configuration (e.g., the number of monitoring occasions, a monitoring duration, etc.) predefined or configured by a network.

This may imply that the UE can perform a sleep operation during the remaining duration of a corresponding DRX cycle if the SS set adaptation PS-PDCCH is not detected in a corresponding determined duration.

ii. Additionally, a plurality of monitoring durations of an SS set adaptation PS-PDCCH for wake-up may be configured in one on-duration. For example, the UE may perform monitoring on the SS set adaptation PS-PDCCH when a DRX cycle starts, and may perform a sleep operation until a next monitoring duration of the SS set adaptation PS-PDCCH upon failing in detection of the PS-PDCCH.

B. If the SS set adaptation PS-PDCCH determines whether to perform PDCCH monitoring, the UE may perform only monitoring on the SS set adaptation PS-PDCCH in each DRX cycle, and may determine SS set(s) to be monitored at a later time according to information in corresponding DCI upon detecting the SS set adaptation PS-PDCCH.

2. Go-to-Sleep (GTS) Purpose

The SS set adaptation PS-PDCCH may be used for the GTS purpose.

If the PS-PDCCH for the GTS purpose (without additional wake-up) operates in association with a DRX operation, the UE may perform monitoring on configured SS sets in a DRX on-duration, and may be indicated to turn specific SS set(s) off by a PS-PDCCH playing a role of GTS. Herein, the GTS may imply an operation result of the PS-PDCCH, and an actual PS-PDCCH may be an SS set adaptation PS-PDCCH detected in a monitoring occasion of an SS set for SS set adaptation.

Since the GTS implies a monitoring skip for the SS set, disadvantageously, it is difficult to cope with upon generation of data to be transmitted to a corresponding UE in a monitoring skip duration. To solve this, the following method may be taken into account.

Method 1) If monitoring of specific SS set(s) is skipped by an SS set adaptation PS-PDCCH, a duration to be skipped may be predefined or may be indicated by a network. For example, a GTS timer may be configured, and monitoring on the SS set(s) may be resumed if this timer expires.

Method 2) If monitoring of specific SS set(s) is skipped by an SS set adaptation PS-PDCCH, monitoring on the SS set adaptation PS-PDCCH may be continuously maintained. This implies that wake-up for SS set(s) of which monitoring is being skipped may be indicated by using the SS set adaptation PS-PDCCH. In this case, a monitoring configuration for the SS set adaptation PS-PDCCH may conform to a configuration for the existing SS set adaptation PS-PDCCH, or a configuration at a specific condition may be predefined or configured additionally. Additionally, the method 2 may also be applied limitedly only when monitoring of all SS sets configured by the GTS is skipped.

3. SS Set Configuration Adaptation Purpose

The SS set adaptation PS-PDCCH may be generally used for the purpose of dynamic adaptation for a SS set configuration. This may imply that the aforementioned PS-PDCCH for the wake-up purpose or GTS purpose is part of the PS-PDCCH for the SS set configuration adaptation purpose. That is, the PS-PDCCH for the SS set configuration adaptation purpose may be used for the wake-up or GTS purpose according to a configuration in DCI.

On/off of SS set monitoring may be performed by the following methods.

A PS-PDCCH may indicate whether to perform monitoring on a configured SS set, and may be implemented in the following manner.

1) Bitmap: In NR, a network may configure up to 10 SS sets for each BWP. Therefore, whether to perform monitoring on each SS set may be indicated by using a bitmap corresponding to the maximum number of SS sets.

2) Combination indication: In order to reduce the number of information bits, the network may use higher layer signaling such as RRC or the like to configure an SS set group simultaneously performing on/off, and may use an indication field in the PS-PDCCH to indicate whether to perform monitoring for each SS set group.

3) In another method, the network may configure SS set(s) capable of performing monitoring on/off through higher layer signaling or the like, and may indicate monitoring on/off based on a bitmap or index for the SS sets. In order to fix the number of information bits, monitoring on/off may be predefined for only a predefined number of SS sets or may be indicated by the network. For example, it may be predefined that SS set monitoring on/off is possible only for 4 SS sets, and the network may configure 4 SS sets among configured SS sets through higher layer signaling or the like. Thereafter, SS set(s) performing (or skipping) monitoring may be indicated by using a 2-bit indication or 4-bit bitmap or the like in the PS-PDCCH.

<Monitoring Periodicity Control>

A network may adjust a monitoring periodicity of specific SS set(s) by using a specific field in a PS-PDCCH. This may be implemented in such a manner that monitoring on part of the existing monitoring occasions is skipped or in such a manner that a monitoring periodicity is changed.

When the part of monitoring occasions is skipped, a scheme of indicating a rule for the skip (e.g., the skip of odd slots or the skip of even slots) or a scheme of indicating a skip duration may be used.

Such a scheme may also be applied to an aggregation level and the number of candidates to be monitored in each SS set.

When a PS-PDCCH for the purpose of the SS set configuration adaptation operates in a non-DRX operation as an additional operation, skipping of monitoring on all configured SS sets may be interpreted as newly defining the same operation as a DRX operation, which may cause unnecessary procedure execution of the network and the UE, a complexity increase, or the like. Therefore, it may be assumed in the present disclosure that an operation of turning on/off all configured SS sets is not performed in the non-DRX operation. This may be interpreted as a restriction for some of functions of the PS-PDCCH for the purpose of SS set configuration adaptation in the non-DRX operation.

<Time Point of Applying PS-PDCCH Information>

It shall be determined from which time point a PS-PDCCH for the aforementioned PDCCH monitoring adaptation will be applied. To this end, a time point of applying the P-PDCCH may be configured by using at least one of the following methods. The methods proposed below may be implemented alone or in combination.

In addition, the following methods may be applied differently depending on the purpose of the PS-PDCCH. For example, methods 1, 2, and 3 below may be used in a PS-PDCCH for wake-up, and a method 4 below may be used in a PS-PDCCH for GTS.

In addition, the following methods may be applied in the same manner not only to a PS-PDCCH for PDCCH monitoring adaptation but also to a PS-PDCCH for other purposes (e.g., antenna adaptation, BWP/SCell operation, etc.). For example, in case of the antenna adaptation, a time point of applying the PS-PDCCH may be determined by adding a delay value related to antenna switching to an offset proposed below.

Method 1. Next Slot of PS-PDCCH Reception Slot

As a simple method, a UE may assume that power saving related content (e.g., SS set on/off, monitoring periodicity change, etc.) indicated by a PS-PDCCH is applied from a slot next to a slot in which the PS-PDCCH is received.

For example, assume that the PS-PDCCH is received in a slot n, and monitoring on all SS sets is skipped in the PS-PDCCH. In this case, the UE may skip monitoring on configured SS set(s) from a slot n+1. However, upon receiving DCI for PDSCH scheduling in the slot n, an operation of receiving the PDSCH may be performed even after the slot n. A technique of the method 1 also includes a technique applied from a symbol next to a CORESET which has received the PS-PDCCH, and a technique for implementing this may be applied in the same manner as described above.

Method 2. Based on PDCCH Decoding Capacity of UE

A time point of applying a PS-PDCCH may be determined based on PDCCH decoding capacity of a UE. This may be effective in a sense that unnecessary buffering or the like can be reduced in an operation such as wake-up or the like. For example, when the UE requires two slots for PDCCH decoding (and TCI application), the UE may assume that a time point of applying a PS-PDCCH received in a slot n is a slot n+2.

Method 3. Determining ACK(/NACK)-Based Timing

When ACK transmission for a PS-PDCCH is introduced, a time point of applying the PS-PDCCH may be determined by considering a delay by which corresponding ACK arrives at a network. For example, when a time required when the network receives ACK for the PS-PDCCH from a time point at which a UE receives the PS-PDCCH is 7 slots, the UE may assume that a time point of applying the PS-PDCCH received in a slot n is a slot n+7.

Method 4. PS-PDCCH Reception Slot

Irrespective of a reception position of a PS-PDCCH in a slot, it may be assumed that information of a PS-PDCCH is applied from the slot. For example, when the present disclosure is applied to a PS-PDCCH, when an SS set of which monitoring is skipped by the PS-PDCCH is detected in a corresponding slot, and when decoding on a candidate of the skipped SS set is stopped or a PDSCH is scheduled, corresponding PDSCH reception may be skipped.

Method 5. Additionally, it may be assumed that, when minimum applicable KO in cross-slot scheduling is configured, a time point of applying a PS-PDCCH for SS set adaptation is determined by an application delay of the minimum application KO. For example, it may be assumed that, when the application delay of the minimum applicable KO is 2 slots, a time point of applying a PS-PDCCH indicating the SS set adaptation is 2 slots after a time point of receiving corresponding DCI.

<PS SS Set Monitoring>

A network may determine whether to apply a power saving scheme by considering a traffic situation of the network, a service type of a UE, a mobility of the UE, a battery situation, or the like. These factors may change dynamically, which may imply that whether to apply the power saving scheme shall also be changeable dynamically. For this reason, the present disclosure proposes to dynamically configure whether to apply the power saving scheme, which can be implemented by using the following method.

The network may indicate a power saving scheme list and/or CORESET/SS set configuration for PS-PDCCH transmission/reception or the like to the UE. In this case, the configuration of the CORESET/SS set or the like may be indicated alone or in combination according to the power saving scheme (combination).

Whether to perform monitoring on a corresponding CORESET/SS set may be indicated by signaling such as RRC/MAC CE or the like by the network. That is, the UE may perform monitoring on a PS-PDCCH after activation of CORESET/SS set monitoring is indicated by additional RRC/MAC CE signaling, rather than performing monitoring based on only the CORESET/SS set configuration for power saving. Deactivation for monitoring may also be indicated by RRC/MAC CE signaling.

For example, the network may indicate a plurality of CORESET/SS sets capable of monitoring a PS-PDCCH through RRC signaling or the like, and may indicate a time point at which the UE performs monitoring and the CORESET/SS set to the UE through MAC CE signaling. Alternatively, CORESET/SS set candidate signaling may be indicated through a broadcast signal (e.g., system information (SIB)) to reduce a signaling overhead or the like.

Figure 18:
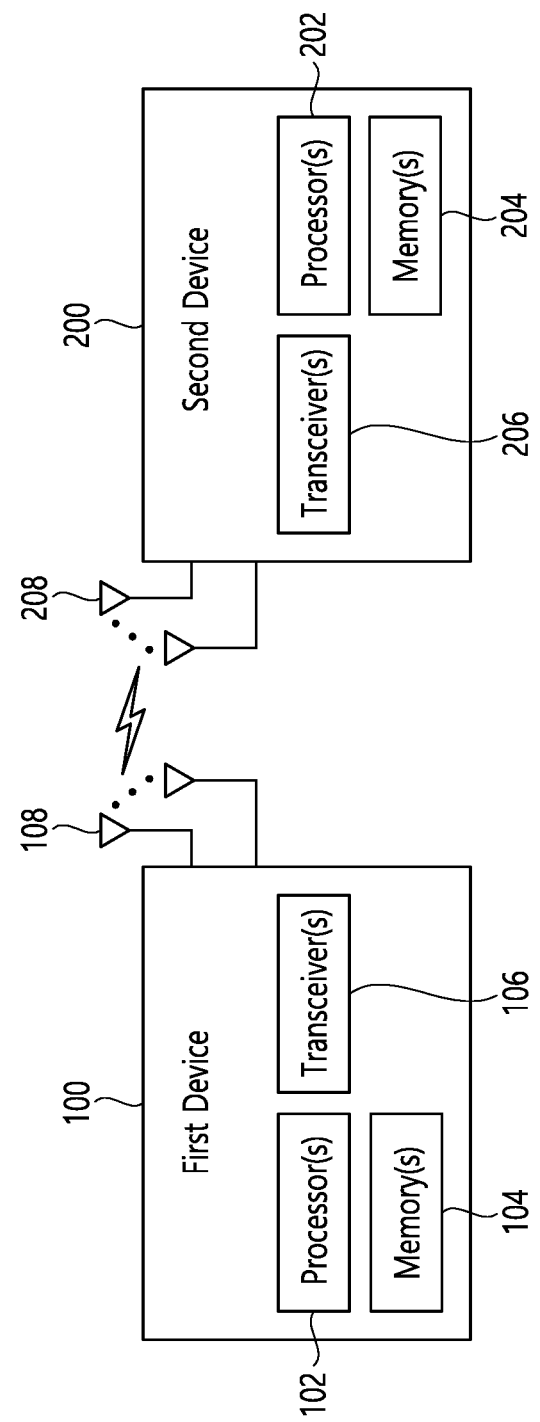
FIG. 18 illustrates a wireless device applicable to the present specification.

FIG. 18 illustrates a wireless device applicable to the present specification.

Referring to FIG. 18, a first wireless device 100 and a second wireless device 200 may transmit radio signals through a variety of RATs (e.g., LTE and NR).

The first wireless device 100 may include one or more processors 102 and one or more memories 104 and additionally further include one or more transceivers 106 and/or one or more antennas 108. The processors 102 may control the memory 104 and/or the transceivers 106 and may be configured to implement the descriptions, functions, procedures, proposals, methods, and/or operational flowcharts disclosed in this document. For example, the processors 102 may process information within the memory 104 to generate first information/signals and then transmit radio signals including the first information/signals through the transceivers 106. In addition, the processor 102 may receive radio signals including second information/signals through the transceiver 106 and then store information obtained by processing the second information/signals in the memory 104. The memory 104 may be connected to the processory 102 and may store a variety of information related to operations of the processor 102. For example, the memory 104 may store software code including commands for performing a part or the entirety of processes controlled by the processor 102 or for performing the descriptions, functions, procedures, proposals, methods, and/or operational flowcharts disclosed in this document. Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. The transceiver 106 may include a transmitter and/or a receiver. The transceiver 106 may be interchangeably used with a radio frequency (RF) unit. In the present specification, the wireless device may represent a communication modem/circuit/chip.

The second wireless device 200 may include one or more processors 202 and one or more memories 204 and additionally further include one or more transceivers 206 and/or one or more antennas 208. The processor 202 may control the memory 204 and/or the transceiver 206 and may be configured to implement the descriptions, functions, procedures, proposals, methods, and/or operational flowcharts disclosed in this document. For example, the processor 202 may process information within the memory 204 to generate third information/signals and then transmit radio signals including the third information/signals through the transceiver 206. In addition, the processor 202 may receive radio signals including fourth information/signals through the transceiver 106 and then store information obtained by processing the fourth information/signals in the memory 204. The memory 204 may be connected to the processor 202 and may store a variety of information related to operations of the processor 202. For example, the memory 204 may store software code including commands for performing a part or the entirety of processes controlled by the processor 202 or for performing the descriptions, functions, procedures, proposals, methods, and/or operational flowcharts disclosed in this document. Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. The transceiver 206 may include a transmitter and/or a receiver. The transceiver 206 may be interchangeably used with an RF unit. In the present specification, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The one or more processors 102 and 202 may be implemented with at least one computer readable medium (CRM) including instructions to be executed by at least one processor. That is, the at least one CRM including the instructions to be executed by the at least one processor may perform operations including receiving an offset based on a starting slot of a DRX-on duration and monitoring a PS-PDCCH notifying of power saving (PS) information in a time window between the starting slot and a time based on the offset.

The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. In addition, the one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. In addition, the one or more processors 102 and 202 may perform control so that the one or more transceivers 106 and 206 may receive user data, control information, or radio signals from one or more other devices. In addition, the one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 19:
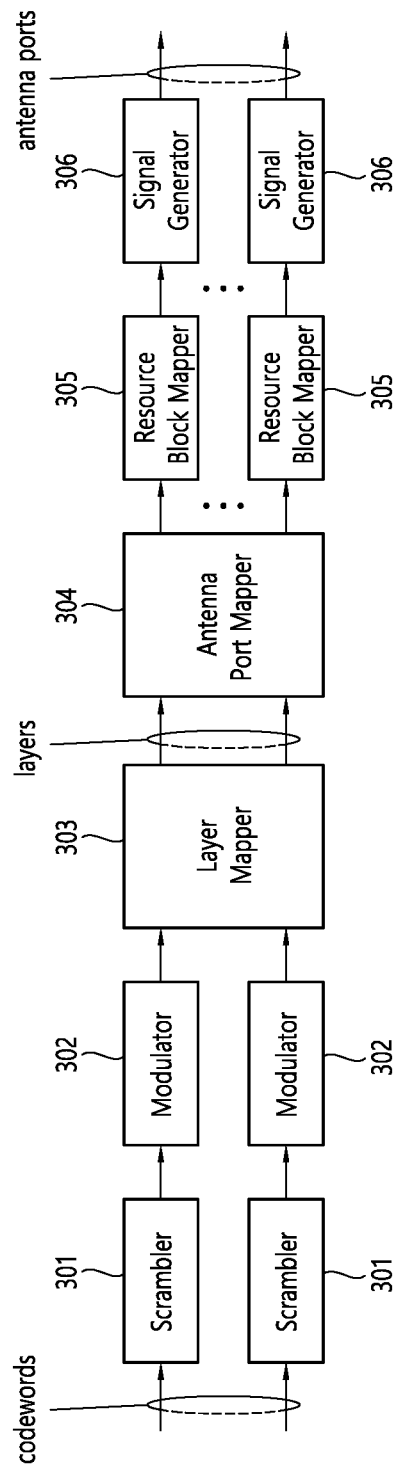
FIG. 19 shows an example of a structure of a signal processing module.

FIG. 19 shows an example of a structure of a signal processing module. Herein, signal processing may be performed in the processors 102 and 202 of FIG. 18.

Referring to FIG. 19, the transmitting device (e.g., a processor, the processor and a memory, or the processor and a transceiver) in a UE or BS may include a scrambler 301, a modulator 302, a layer mapper 303, an antenna port mapper 304, a resource block mapper 305, and a signal generator 306.

The transmitting device can transmit one or more codewords. Coded bits in each codeword are scrambled by the corresponding scrambler 301 and transmitted over a physical channel. A codeword may be referred to as a data string and may be equivalent to a transport block which is a data block provided by the MAC layer.

Scrambled bits are modulated into complex-valued modulation symbols by the corresponding modulator 302. The modulator 302 can modulate the scrambled bits according to a modulation scheme to arrange complex-valued modulation symbols representing positions on a signal constellation. The modulation scheme is not limited and m-PSK (m-Phase Shift Keying) or m-QAM (m-Quadrature Amplitude Modulation) may be used to modulate the coded data. The modulator may be referred to as a modulation mapper.

The complex-valued modulation symbols can be mapped to one or more transport layers by the layer mapper 303. Complex-valued modulation symbols on each layer can be mapped by the antenna port mapper 304 for transmission on an antenna port.

Each resource block mapper 305 can map complex-valued modulation symbols with respect to each antenna port to appropriate resource elements in a virtual resource block allocated for transmission. The resource block mapper can map the virtual resource block to a physical resource block according to an appropriate mapping scheme. The resource block mapper 305 can allocate complex-valued modulation symbols with respect to each antenna port to appropriate subcarriers and multiplex the complex-valued modulation symbols according to a user.

Signal generator 306 can modulate complex-valued modulation symbols with respect to each antenna port, that is, antenna-specific symbols, according to a specific modulation scheme, for example, OFDM (Orthogonal Frequency Division Multiplexing), to generate a complex-valued time domain OFDM symbol signal. The signal generator can perform IFFT (Inverse Fast Fourier Transform) on the antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator may include an IFFT module, a CP inserting unit, a digital-to-analog converter (DAC) and a frequency upconverter.

Figure 20:
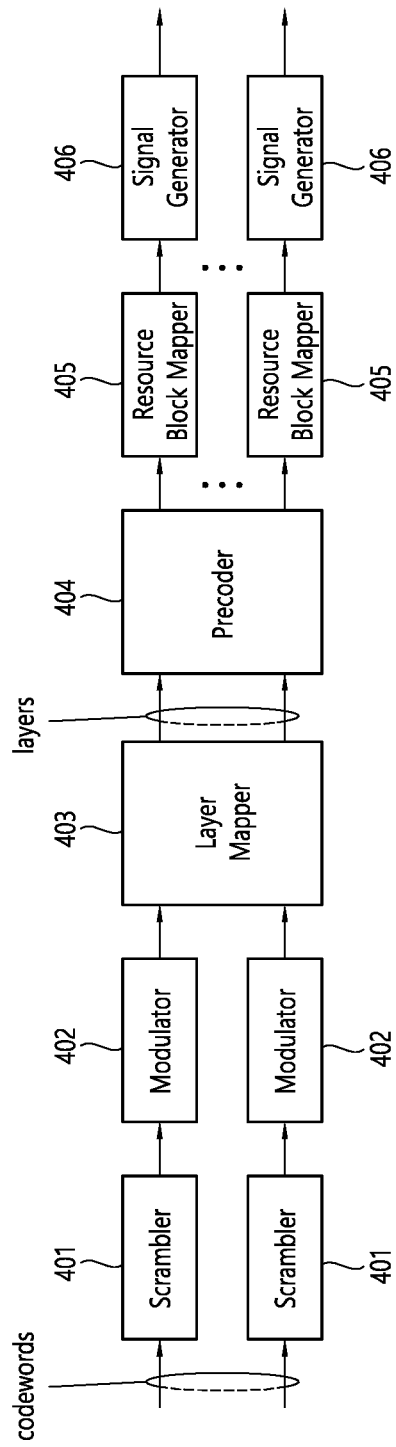
FIG. 20 shows another example of a structure of a signal processing module in a transmitting device.

FIG. 20 shows another example of a structure of a signal processing module in a transmitting device. Herein, signal processing may be performed in a processor of a UE/BS, such as the processors 102 and 202 of FIG. 18.

Referring to FIG. 20, the transmitting device (e.g., a processor, the processor and a memory, or the processor and a transceiver) in the UE or the BS may include a scrambler 401, a modulator 402, a layer mapper 403, a precoder 404, a resource block mapper 405, and a signal generator 406.

The transmitting device can scramble coded bits in a codeword by the corresponding scrambler 401 and then transmit the scrambled coded bits through a physical channel.

Scrambled bits are modulated into complex-valued modulation symbols by the corresponding modulator 402. The modulator can modulate the scrambled bits according to a predetermined modulation scheme to arrange complex-valued modulation symbols representing positions on a signal constellation. The modulation scheme is not limited and pi/2-BPSK (pi/2-Binary Phase Shift Keying), m-PSK (m-Phase Shift Keying) or m-QAM (m-Quadrature Amplitude Modulation) may be used to modulate the coded data.

The complex-valued modulation symbols can be mapped to one or more transport layers by the layer mapper 403.

Complex-valued modulation symbols on each layer can be precoded by the precoder 404 for transmission on an antenna port. Here, the precoder may perform transform precoding on the complex-valued modulation symbols and then perform precoding. Alternatively, the precoder may perform precoding without performing transform precoding. The precoder 404 can process the complex-valued modulation symbols according to MIMO using multiple transmission antennas to output antenna-specific symbols and distribute the antenna-specific symbols to the corresponding resource block mapper 405. An output z of the precoder 404 can be obtained by multiplying an output y of the layer mapper 403 by an N×M precoding matrix W. Here, N is the number of antenna ports and M is the number of layers.

Each resource block mapper 405 maps complex-valued modulation symbols with respect to each antenna port to appropriate resource elements in a virtual resource block allocated for transmission.

The resource block mapper 405 can allocate complex-valued modulation symbols to appropriate subcarriers and multiplex the complex-valued modulation symbols according to a user.

Signal generator 406 can modulate complex-valued modulation symbols according to a specific modulation scheme, for example, OFDM, to generate a complex-valued time domain OFDM symbol signal. The signal generator 406 can perform IFFT (Inverse Fast Fourier Transform) on antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator 406 may include an IFFT module, a CP inserting unit, a digital-to-analog converter (DAC), and a frequency upconverter.

The signal processing procedure of the receiving device may be reverse to the signal processing procedure of the transmitting device. Specifically, the processor of the transmitting device decodes and demodulates RF signals received through antenna ports of the transceiver. The receiving device may include a plurality of reception antennas, and signals received through the reception antennas are restored to baseband signals, and then multiplexed and demodulated according to MIMO to be restored to a data string intended to be transmitted by the transmitting device. The receiving device may include a signal restoration unit that restores received signals to baseband signals, a multiplexer for combining and multiplexing received signals, and a channel demodulator for demodulating multiplexed signal strings into corresponding codewords. The signal restoration unit, the multiplexer and the channel demodulator may be configured as an integrated module or independent modules for executing functions thereof. More specifically, the signal restoration unit may include an analog-to-digital converter (ADC) for converting an analog signal into a digital signal, a CP removal unit that removes a CP from the digital signal, an FET module for applying FFT (fast Fourier transform) to the signal from which the CP has been removed to output frequency domain symbols, and a resource element demapper/equalizer for restoring the frequency domain symbols to antenna-specific symbols. The antenna-specific symbols are restored to transport layers by the multiplexer and the transport layers are restored by the channel demodulator to codewords intended to be transmitted by the transmitting device.

Figure 21:
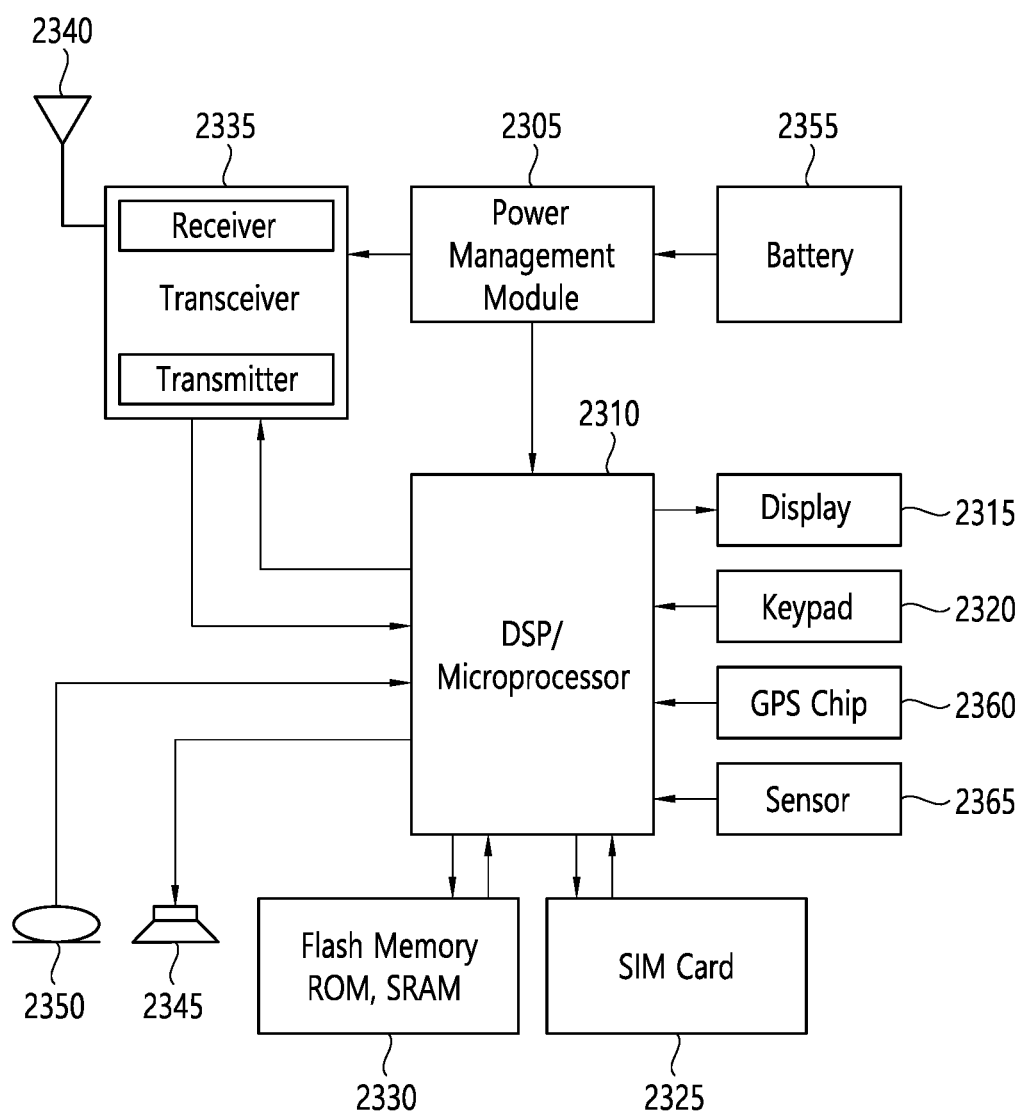
FIG. 21 illustrates an example of a wireless communication device for implementing the present disclosure.

FIG. 21 illustrates an example of a wireless communication device according to an implementation example of the present disclosure.

Referring to FIG. 21, the wireless communication device, for example, a terminal may include at least one of a processor 2310 such as a digital signal processor (DSP) or a microprocessor, a transceiver 2335, a power management module 2305, an antenna 2340, a battery 2355, a display 2315, a keypad 2320, a global positioning system (GPS) chip 2360, a sensor 2365, a memory 2330, a subscriber identification module (SIM) card 2325, a speaker 2345 and a microphone 2350. A plurality of antennas and a plurality of processors may be provided.

The processor 2310 can implement functions, procedures and methods described in the present description. The processor 2310 in FIG. 21 may be the processors 1811 and 1821 in FIG. 18.

The memory 2330 is connected to the processor 2310 and stores information related to operations of the processor. The memory may be located inside or outside the processor and connected to the processor through various techniques such as wired connection and wireless connection. The memory 2330 in FIG. 21 may be the memories 1813 and 1823 in FIG. 18.

A user can input various types of information such as telephone numbers using various techniques such as pressing buttons of the keypad 2320 or activating sound using the microphone 2350. The processor 2310 can receive and process user information and execute an appropriate function such as calling using an input telephone number. In some scenarios, data can be retrieved from the SIM card 2325 or the memory 2330 to execute appropriate functions. In some scenarios, the processor 2310 can display various types of information and data on the display 2315 for user convenience.

The transceiver 2335 is connected to the processor 2310 and transmit and/or receive RF signals. The processor can control the transceiver in order to start communication or to transmit RF signals including various types of information or data such as voice communication data. The transceiver includes a transmitter and a receiver for transmitting and receiving RF signals. The antenna 2340 can facilitate transmission and reception of RF signals. In some implementation examples, when the transceiver receives an RF signal, the transceiver can forward and convert the signal into a baseband frequency for processing performed by the processor. The signal can be processed through various techniques such as converting into audible or readable information to be output through the speaker 2345. The transceiver in FIG. 21 may be the transceivers 1812 and 1822 in FIG. 18.

Although not shown in FIG. 21, various components such as a camera and a universal serial bus (USB) port may be additionally included in the terminal. For example, the camera may be connected to the processor 2310.

FIG. 21 is an example of implementation with respect to the terminal and implementation examples of the present disclosure are not limited thereto. The terminal need not essentially include all the components shown in FIG. 21. That is, some of the components, for example, the keypad 2320, the GPS chip 2360, the sensor 2365 and the SIM card 2325 may not be essential components. In this case, they may not be included in the terminal.

Figure 22:
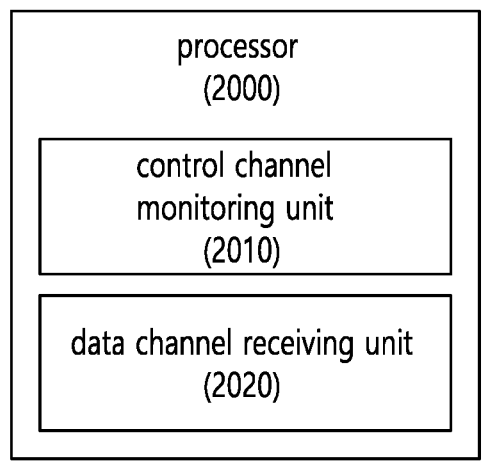
FIG. 22 shows an example of a processor 2000.

FIG. 22 shows an example of a processor 2000.

Referring to FIG. 22, the processor 2000 may include a control channel monitoring unit 2010 and a data channel receiving unit 2020. The processor 2000 may execute the methods described in FIG. 15 to FIG. 17 (from a perspective of a receiver). For example, the processor 2000 may receive an offset based on a starting slot of a DRX-on duration, and may monitor a PS-PDCCH notifying of power saving (PS) information in a time window between the starting slot and a time based on the offset. Upon detecting/receiving a PDCCH including scheduling information in the DRX-on duration, a PDSCH may be received based on the PDCCH (or a PUSCH may be transmitted). The processor 2000 may be an example of the processors 102 and 202 of FIG. 18.

Figure 23:
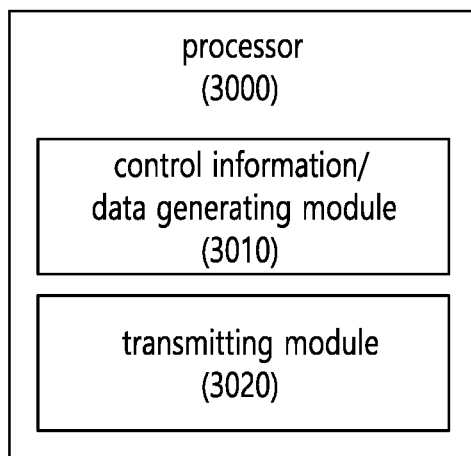
FIG. 23 shows an example of a processor 3000.

FIG. 23 shows an example of a processor 3000.

Referring to FIG. 23, the processor 3000 may include a control information/data generating module 3010 and a transmitting module 3020. The processor 3000 may execute the methods described in FIG. 15 to FIG. 17 (from a perspective of a transceiver). For example, the processor 3000 may generate an offset based on a starting slot of a DRX-on duration, and then may notify a UE about it. In addition, the processor 3000 may transmit a PS-PDCCH notifying of power saving (PS) information in a time window between the starting slot and a time based on the offset. Thereafter, a PDCCH including scheduling information may be transmitted in the DRX-on duration, and a PDSCH may be transmitted or a PUSCH may be received based on the PDCCH. The processor 3000 may be an example of the processors 102 and 202 of FIG. 18.

Figure 24:
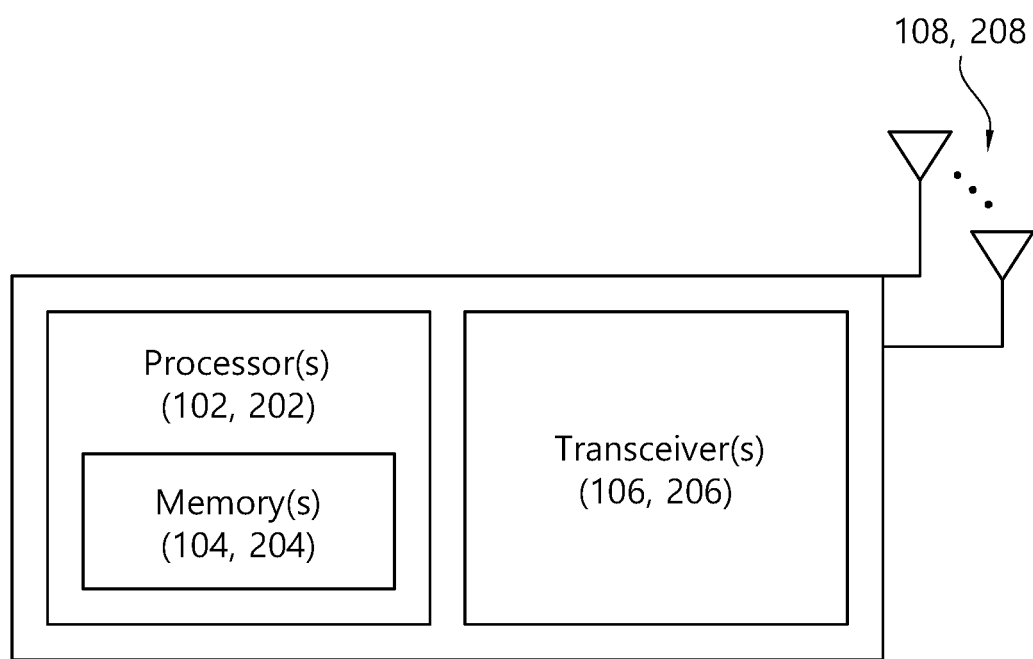
FIG. 24 shows another example of a wireless device.

FIG. 24 shows another example of a wireless device.

Referring to FIG. 24, the wireless device may include one or more processors 102 and 202, one or more memories 104 and 204, and one or more transceivers 108 and 208.

The example of the wireless device described in FIG. 18 is different from the example of the wireless described in FIG. 24 in that the processors 102 and 202 and the memories 104 and 204 are separated in FIG. 18 whereas the memories 104 and 204 are included in the processors 102 and 202 in the example of FIG. 24. That is, the processor and the memory may constitute one chipset. That is, a chipset (a device of a wireless communication system) may include a processor and a memory coupled with the processor, wherein the processor is configured to receive an offset based on a starting slot of a DRX-on duration and to monitor a PS-PDCCH notifying of PS information in a time window between the time slot and a time based on the offset.

Figure 25:
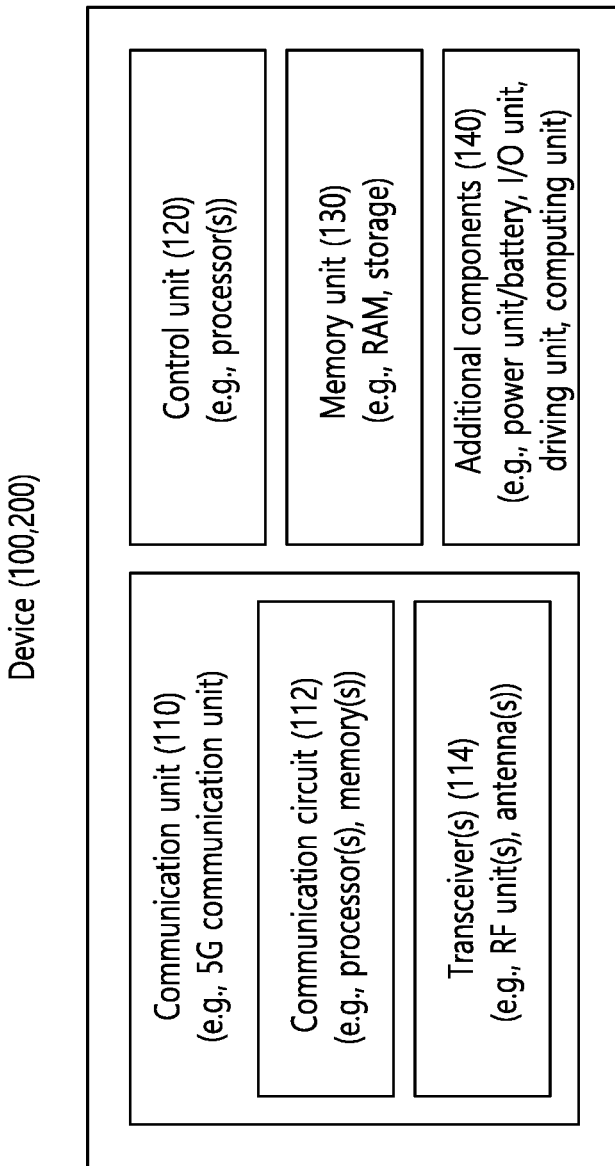
FIG. 25 shows another example of a wireless device applied to the present specification.

FIG. 25 shows another example of a wireless device applied to the present specification. The wireless device may be implemented in various forms according to a use-case/service.

Referring to FIG. 25, wireless devices 100 and 200 may correspond to the wireless devices 100 and 200 of FIG. 18 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 18. For example, the transceiver(s) 114 may include the one or more transceivers 106 and 206 and/or the one or more antennas 108 and 208 of FIG. 18. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. In addition, the control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 20), the vehicles (100*b*-1 and 100*b*-2 of FIG. 20), the XR device (100*c* of FIG. 20), the hand-held device (100*d* of FIG. 20), the home appliance (100*e* of FIG. 20), the IoT device (100*f* of FIG. 20), a digital broadcast terminal, a hologram device, a public safety device, an MTC device, a medicine device, a fintech device (or a finance device), a security device, a climate/environment device, the AI server/device (400 of FIG. 20), the BSs (200 of FIG. 20), a network node, etc. The wireless device may be used in a mobile or fixed place according to a use-example/service.

In FIG. 25, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. In addition, each element, component, unit/portion, and/or module within the wireless devices 100 and 200 may further include one or more elements. For example, the control unit 120 may be configured by a set of one or more processors. For example, the control unit 120 may be configured by a set of a communication control processor, an application processor, an Electronic Control Unit (ECU), a graphical processing unit, and a memory control processor. For another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 26:
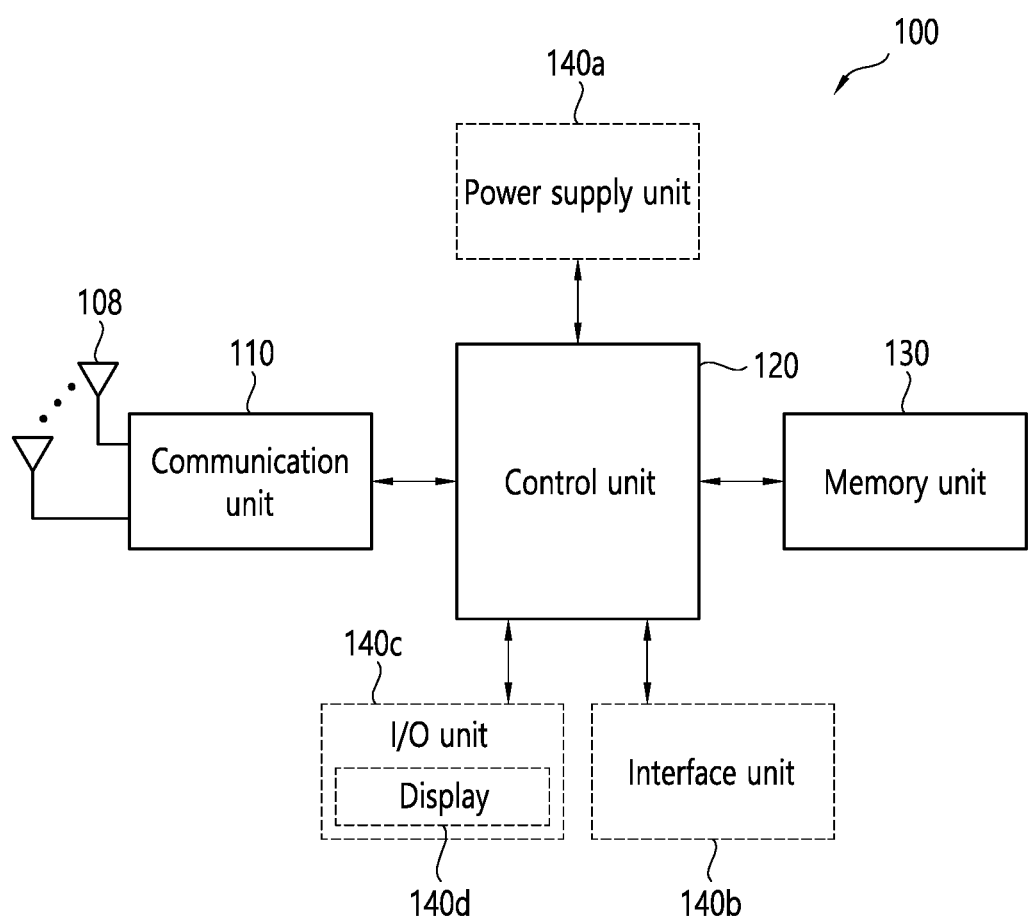
FIG. 26 illustrates a hand-held device applied to the present specification.

FIG. 26 illustrates a hand-held device applied to the present specification. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 26, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* respective correspond to the blocks 110 to 130/140 of FIG. 25.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. In addition, the memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

For example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. In addition, the communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Figure 27:
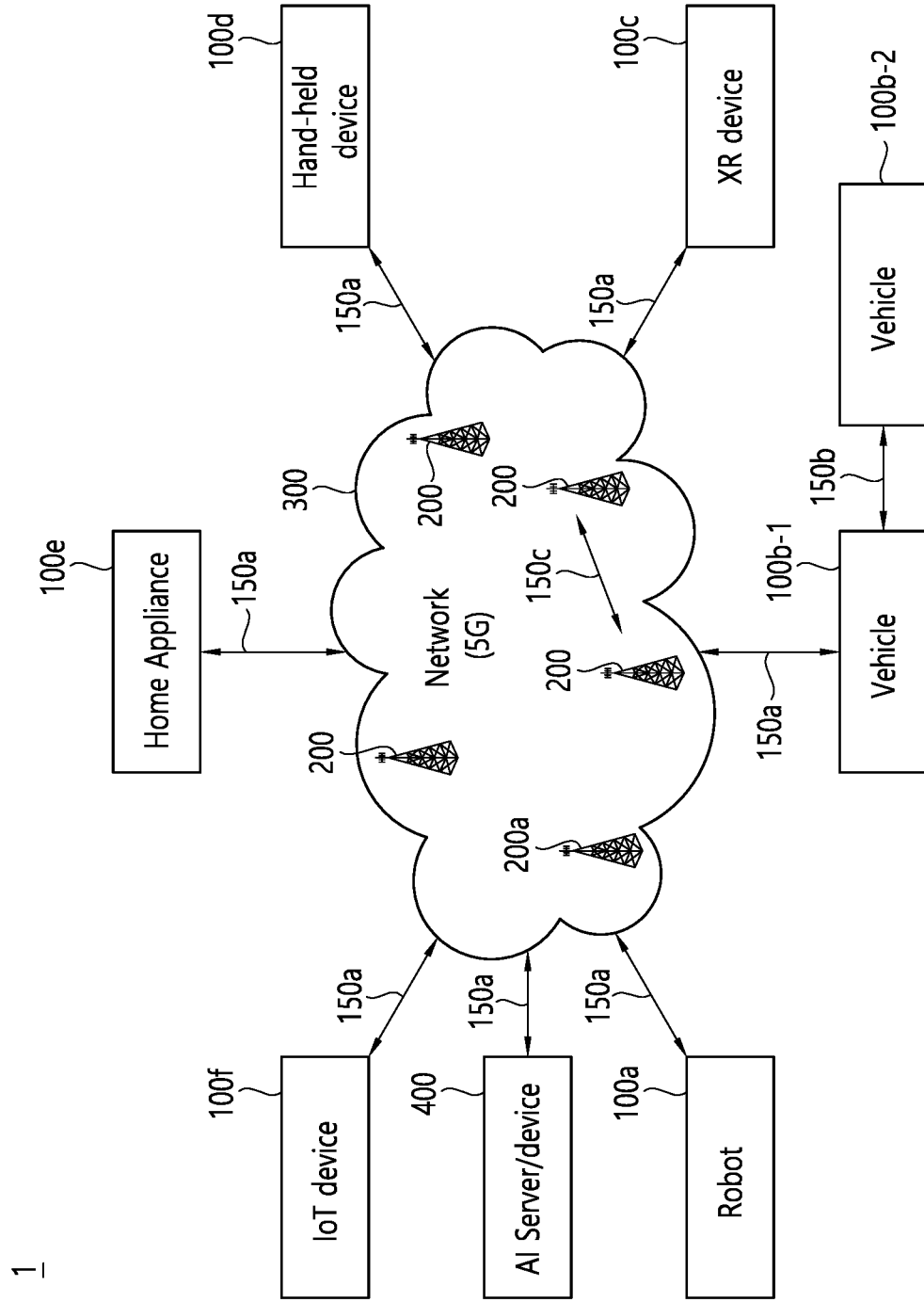
FIG. 27 illustrates a communication system 1 applied to the present specification.

FIG. 27 illustrates a communication system 1 applied to the present specification.

Referring to FIG. 27, a communication system 1 applied to the present specification includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). In addition, the IoT device (e.g., a sensor) may perform direct communication with other IoT devices (e.g., sensors) or other wireless devices 100*a* to 100*f*.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Meanwhile, the NR supports multiple numerologies (or subcarrier spacing (SCS)) for supporting diverse 5G services. For example, if the SCS is 15 kHz, a wide area of the conventional cellular bands may be supported. If the SCS is 30 kHz/60 kHz, a dense-urban, lower latency, and wider carrier bandwidth is supported. If the SCS is 60 kHz or higher, a bandwidth greater than 24.25 GHz is used in order to overcome phase noise.

An NR frequency band may be defined as a frequency range of two types (FR1, FR2). Values of the frequency range may be changed. For example, the frequency range of the two types (FR1, FR2) may be as shown below in Table 7. For convenience of explanation, among the frequency ranges that are used in an NR system, FR1 may mean a "sub 6 GHz range", and FR2 may mean an "above 6 GHz range" and may also be referred to as a millimeter wave (mmW).

TABLE 7

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed. For example, as shown in Table 8 below, FR1 may include a band in the range of 410 MHz to 7125 MHz. That is, FR1 may include a frequency band of at least 6 GHz (or 5850, 5900, 5925 MHz, and so on). For example, a frequency band of at least 6 GHz (or 5850, 5900, 5925 MHz, and so on) included in FR1 may include an unlicensed band. The unlicensed band may be used for diverse purposes, e.g., the unlicensed band for vehicle-specific communication (e.g., automated driving).

TABLE 8

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 28:
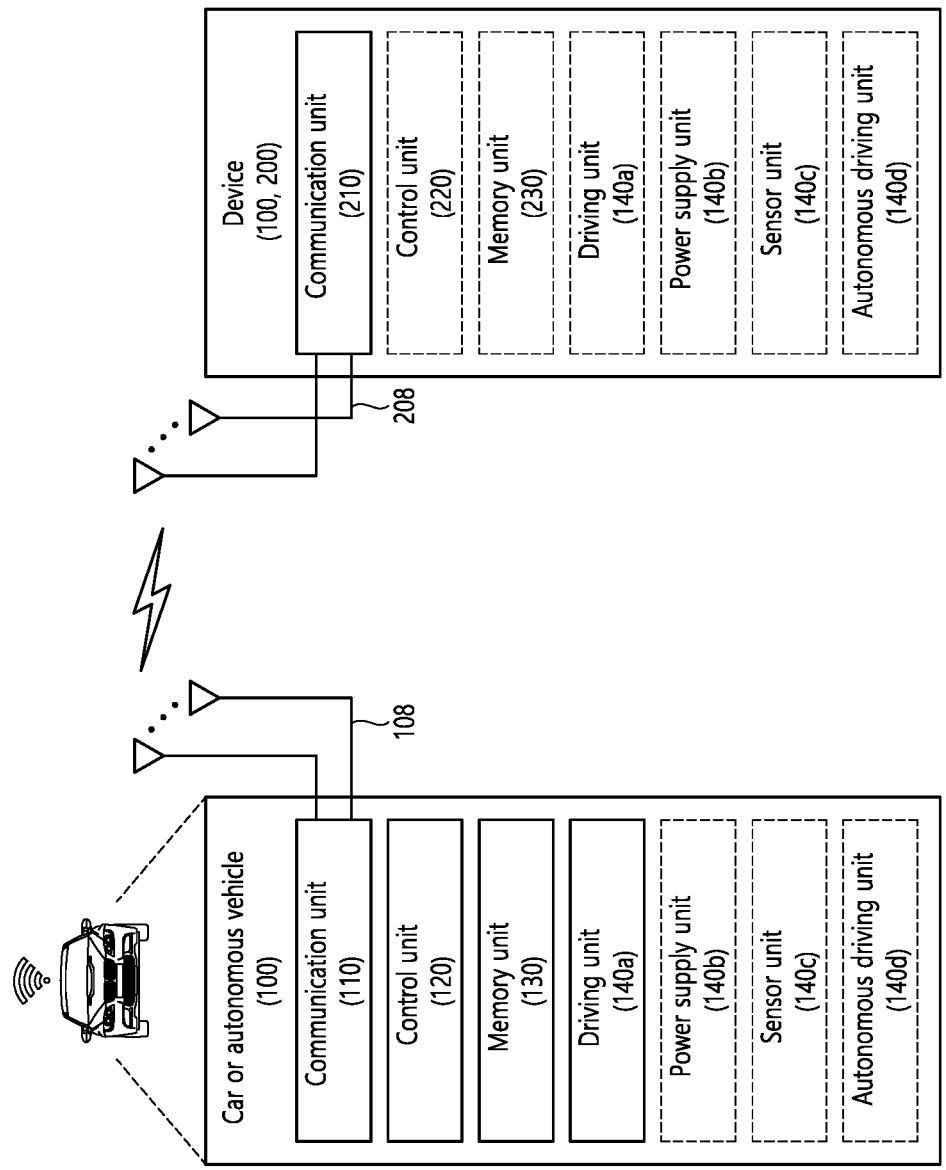
FIG. 28 illustrates a vehicle or an autonomous vehicle applicable to the present specification.

FIG. 28 illustrates a vehicle or an autonomous vehicle applicable to the present specification. The vehicle or autonomous vehicle may be implemented by a mobile robot, a car, a train, a manned/unmanned Aerial Vehicle (AV), a ship, etc.

Referring to FIG. 28, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d respectively correspond to the blocks 110/130/140 of FIG. 25.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims disclosed in the present specification can be combined in various ways. For example, technical features in method claims of the present specification can be combined to be implemented or performed in an apparatus, and technical features in apparatus claims of the present specification can be combined to be implemented or performed in a method. Further, technical features in method claims and apparatus claims of the present specification can be combined to be implemented or performed in an apparatus. Further, technical features in method claims and apparatus claims of the present specification can be combined to be implemented or performed in a method.

What is claimed is:

1. A method of monitoring a physical downlink control channel (PDCCH) of a user equipment (UE) in a wireless communication system, the method comprising:
receiving a configuration related to a plurality of PDCCH monitoring occasions;
receiving an offset based on a starting slot of a discontinuous reception (DRX)-on duration; and
monitoring a PS-PDCCH notifying of power saving (PS) information in at least one PDCCH monitoring occasion among the plurality of PDCCH monitoring occasions,
wherein the PS-PDCCH is not monitored in the DRX-on duration, and
wherein the PS-PDCCH is monitored in the at least one PDCCH monitoring occasion located in a time window between a time based on the offset and the starting slot of the DRX-on duration.

2. The method of claim 1, wherein the at least one PDCCH monitoring occasion is located in one or a plurality of consecutive slots.

3. The method of claim 1, wherein the at least one PDCCH monitoring occasion is located periodically.

4. The method of claim 1, wherein the offset is received through a higher layer signal from a network.

5. The method of claim 1, wherein the PS-PDCCH comprises a field indicating whether the UE wakes up.

6. The method of claim 5, wherein if the field indicating whether the UE wakes up indicates the wake-up of the UE, the PDCCH is monitored in the DRX-on duration.

7. The method of claim 5, wherein if the field indicating whether the UE wakes up does not indicate the wake-up of the UE, the PDCCH is not monitored in the DRX-on duration.

8. The method of claim 1, wherein the PS-PDCCH is not monitored in a PDCCH monitoring occasion not located within the time window among the plurality of PDCCH monitoring occasions.

9. A user equipment (UE) comprising:
a transceiver transmitting and receiving a radio signal; and
a processor operatively coupled with the transceiver,
wherein the processor is configured to:
receive a configuration related to a plurality of PDCCH monitoring occasions,
receive an offset based on a starting slot of a discontinuous reception (DRX)-on duration, and
monitor a PS-PDCCH notifying of power saving (PS) information in at least one PDCCH monitoring occasion among the plurality of PDCCH monitoring occasions,
wherein the PS-PDCCH is not monitored in the DRX-on duration, and
wherein the PS-PDCCH is monitored in the at least one PDCCH monitoring occasion located in a time window between a time based on the offset and the starting slot of the DRX-on duration.

10. The UE of claim 9, wherein the at least one PDCCH monitoring occasion is located in one or a plurality of consecutive slots.

11. The UE of claim 9, wherein the at least one PDCCH monitoring occasion is located periodically.

12. The UE of claim 9, wherein the offset is received through a higher layer signal from a network.

13. The UE of claim 9, wherein the PS-PDCCH comprises a field indicating whether the UE wakes up.

14. The UE of claim 13, wherein if the field indicating whether the UE wakes up indicates the wake-up of the UE, the PDCCH is monitored in the DRX-on duration.

15. The UE of claim 13, wherein if the field indicating whether the UE wakes up does not indicate the wake-up of the UE, the PDCCH is not monitored in the DRX-on duration.

16. The UE of claim 9, wherein the PS-PDCCH is not monitored in a PDCCH monitoring occasion not located within the time window among the plurality of PDCCH monitoring occasions.

17. A method of transmitting a physical downlink control channel (PDCCH) of a base station (BS) in a wireless communication system, the method comprising:
transmitting a configuration related to a plurality of PDCCH monitoring occasions;
transmitting an offset based on a starting slot of a discontinuous reception (DRX)-on duration; and
transmitting a PS-PDCCH notifying of power saving (PS) information in at least one physical downlink control (PDCCH) monitoring occasion among the plurality of PDCCH monitoring occasions,
wherein the PS-PDCCH is not transmitted in the DRX-on duration, and
wherein the PS-PDCCH is transmitted in the at least one PDCCH monitoring occasion located in a time window between a time based on the offset and the starting slot of the DRX-on duration.

18. An apparatus of a wireless communication system, the apparatus comprising:
a processor; and
a memory operatively coupled with the processor,
the processor is configured to:
receive a configuration related to a plurality of PDCCH monitoring occasions,
receive an offset based on a starting slot of a discontinuous reception (DRX)-on duration; and
monitor a PS-PDCCH notifying of power saving (PS) information in at least one physical downlink control (PDCCH) monitoring occasion among the plurality of PDCCH monitoring occasions,
wherein the PS-PDCCH is not monitored in the DRX-on duration, and
wherein the PS-PDCCH is monitored in the at least one PDCCH monitoring occasion located in a time window between a time based on the offset and the starting slot of the DRX-on duration.

* * * * *